(12) United States Patent
Reville et al.

(10) Patent No.: US 8,446,414 B2
(45) Date of Patent: May 21, 2013

(54) PROGRAMMING APIS FOR AN EXTENSIBLE AVATAR SYSTEM

(75) Inventors: Brendan K. Reville, Seattle, WA (US); Thomas A. Langan, Seattle, WA (US); Dan B. Kroymann, Bothell, WA (US); Derek H. Smith, Snohomish, WA (US); Stacey Law, Redmond, WA (US); Bjorn Toft Madsen, Ashby de la Zouch (GB); Rodney Alan Boyd, London (GB)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 12/271,690

(22) Filed: Nov. 14, 2008

(65) Prior Publication Data

US 2010/0009747 A1    Jan. 14, 2010

Related U.S. Application Data

(60) Provisional application No. 61/080,626, filed on Jul. 14, 2008.

(51) Int. Cl.
*G06T 15/70* (2006.01)
(52) U.S. Cl.
USPC ............... 345/473; 345/419; 345/426; 463/1; 463/31; 463/32; 463/37; 463/40
(58) Field of Classification Search
USPC .................. 715/700, 757, 706, 848; 345/419, 345/473, 426; 463/1, 31, 32, 37, 40, 42
See application file for complete search history.

(56) References Cited

U.S. PATENT DOCUMENTS

| | | |
|---|---|---|
| 5,880,731 A | 3/1999 | Liles |
| 6,227,974 B1 | 5/2001 | Eilat |
| 6,229,533 B1 | 5/2001 | Farmer |
| 6,268,872 B1 | 7/2001 | Matsuda et al. |
| 6,385,642 B1 | 5/2002 | Chlan et al. |
| 6,545,682 B1 | 4/2003 | Ventrella et al. |
| 6,692,359 B1 | 2/2004 | Williams et al. |
| 6,697,072 B2 * | 2/2004 | Russell et al. ............. 345/474 |
| 6,910,186 B2 | 6/2005 | Kim |
| 7,006,098 B2 | 2/2006 | Bickmore et al. |

(Continued)

FOREIGN PATENT DOCUMENTS

| | | |
|---|---|---|
| KR | 10-2008-0033781 A | 4/2008 |
| WO | WO 01/59709 A1 | 8/2001 |
| WO | WO 2004/053799 A1 | 6/2004 |
| WO | WO 2006/107182 A1 | 10/2006 |

OTHER PUBLICATIONS

Fischer "Skript: an extendable language flexible avatar control framework for VR applications", Thesis 2005.*

(Continued)

*Primary Examiner* — Kimbinh T Nguyen
(74) *Attorney, Agent, or Firm* — Woodcock Washburn LLP

(57) ABSTRACT

Disclosed is an application programming interface (API) that provides for an extensible avatar system. In one embodiment an API may allow video game applications to retrieve structures of data which represent an avatar. The game can then take those structures and incorporate the data into its own rendering system. In another embodiment an API may allow a video game application to render an avatar to a render target or texture wherein the video game system performs rendering and animation functions.

20 Claims, 18 Drawing Sheets

U.S. PATENT DOCUMENTS

| | | | |
|---|---|---|---|
| 7,275,987 | B2 | 10/2007 | Shimakawa et al. |
| 7,342,587 | B2 | 3/2008 | Danzig et al. |
| 7,425,169 | B2 | 9/2008 | Ganz |
| 7,568,004 | B2 | 7/2009 | Gottfried |
| 7,636,755 | B2 | 12/2009 | Blattner et al. |
| 7,690,997 | B2 | 4/2010 | Van Luchene et al. |
| 7,824,253 | B2 | 11/2010 | Thompson et al. |
| 7,840,903 | B1 | 11/2010 | Amidon et al. |
| 7,849,043 | B2 | 12/2010 | Woolf et al. |
| 7,913,176 | B1 | 3/2011 | Blattner et al. |
| 8,047,915 | B2 * | 11/2011 | Lyle et al. ......... 463/31 |
| 8,099,338 | B2 | 1/2012 | Betzler et al. |
| 8,187,067 | B2 | 5/2012 | Hamilton et al. |
| 2001/0019337 | A1 | 9/2001 | Kim |
| 2002/0067362 | A1 | 6/2002 | Agostino Nocera et al. |
| 2002/0068626 | A1 | 6/2002 | Takeda et al. |
| 2002/0151364 | A1 | 10/2002 | Suchocki |
| 2003/0228908 | A1 | 12/2003 | Caiafa et al. |
| 2004/0152512 | A1 | 8/2004 | Collodi et al. |
| 2004/0221224 | A1 | 11/2004 | Blattner |
| 2004/0250210 | A1 | 12/2004 | Huang et al. |
| 2005/0137015 | A1 | 6/2005 | Rogers et al. |
| 2005/0143174 | A1 | 6/2005 | Goldman et al. |
| 2005/0216558 | A1 | 9/2005 | Flesch et al. |
| 2005/0248574 | A1 | 11/2005 | Asktekar et al. |
| 2006/0046820 | A1 | 3/2006 | Inamura |
| 2006/0121991 | A1 | 6/2006 | Borinik et al. |
| 2006/0143569 | A1 | 6/2006 | Kinsella et al. |
| 2006/0184355 | A1 | 8/2006 | Ballin et al. |
| 2006/0188144 | A1 | 8/2006 | Sasaki et al. |
| 2006/0293103 | A1 | 12/2006 | Mendelsohn |
| 2006/0294465 | A1 | 12/2006 | Ronen et al. |
| 2007/0002057 | A1 | 1/2007 | Danzig et al. |
| 2007/0074114 | A1 | 3/2007 | Adjali et al. |
| 2007/0110298 | A1 * | 5/2007 | Graepel et al. ......... 382/154 |
| 2007/0111789 | A1 | 5/2007 | Van Deursen et al. |
| 2007/0113181 | A1 | 5/2007 | Blattner et al. |
| 2007/0167204 | A1 | 7/2007 | Lyle et al. |
| 2007/0168863 | A1 | 7/2007 | Blattner et al. |
| 2007/0178966 | A1 | 8/2007 | Pohlman et al. |
| 2007/0197296 | A1 | 8/2007 | Lee |
| 2007/0225070 | A1 | 9/2007 | Zahorik et al. |
| 2007/0259713 | A1 | 11/2007 | Fiden et al. |
| 2007/0260984 | A1 | 11/2007 | Marks et al. |
| 2007/0273711 | A1 | 11/2007 | Maffei |
| 2007/0293319 | A1 | 12/2007 | Stamper et al. |
| 2007/0298866 | A1 * | 12/2007 | Gaudiano et al. ......... 463/23 |
| 2008/0001951 | A1 | 1/2008 | Marks et al. |
| 2008/0045283 | A1 | 2/2008 | Stamper et al. |
| 2008/0059570 | A1 | 3/2008 | Bill |
| 2008/0076519 | A1 | 3/2008 | Chim |
| 2008/0081701 | A1 | 4/2008 | Shuster |
| 2008/0091692 | A1 * | 4/2008 | Keith et al. ......... 707/100 |
| 2008/0120558 | A1 | 5/2008 | Nathan et al. |
| 2008/0158232 | A1 | 7/2008 | Shuster |
| 2008/0215974 | A1 * | 9/2008 | Harrison et al. ......... 715/706 |
| 2008/0215975 | A1 * | 9/2008 | Harrison et al. ......... 715/706 |
| 2008/0220876 | A1 | 9/2008 | Mehta et al. |
| 2008/0250315 | A1 | 10/2008 | Eronen et al. |
| 2008/0301556 | A1 | 12/2008 | Williams et al. |
| 2008/0303830 | A1 * | 12/2008 | Fleury et al. ......... 345/473 |
| 2008/0309675 | A1 * | 12/2008 | Fleury et al. ......... 345/581 |
| 2008/0309677 | A1 | 12/2008 | Fleury et al. |
| 2009/0063983 | A1 | 3/2009 | Amidon et al. |
| 2009/0069084 | A1 * | 3/2009 | Reece et al. ......... 463/32 |
| 2009/0106671 | A1 | 4/2009 | Olson et al. |
| 2009/0198741 | A1 | 8/2009 | Cooper |
| 2009/0267960 | A1 | 10/2009 | Finn et al. |
| 2009/0312080 | A1 | 12/2009 | Hamilton et al. |
| 2010/0009747 | A1 | 1/2010 | Reville et al. |
| 2010/0023885 | A1 | 1/2010 | Reville et al. |
| 2010/0035692 | A1 | 2/2010 | Reville et al. |
| 2010/0203968 | A1 | 8/2010 | Gill et al. |
| 2010/0233667 | A1 | 9/2010 | Wilson et al. |

OTHER PUBLICATIONS

Kafai et al., "Your Second Selves: Avatar Designs and Identity Play in a Teen Virtual World," http://www.gseis.ucla.edu/faculty/kafai/paper/whyville_pdfs/DIGRA07_avatar.pdf, downloaded 2008, 1-9.

Vasalou et al., "Constructing My Online Self: Avatars that Increase Self-focused Attention," http://www.luminainteractive.com/research/downloads/note137-vasalou.pdf, downloaded 2008, 1-4.

Folea et al., "MPEG-4 SDK: From Specifications to Real Applications," http://www-artemis.int-evry.fr/Publications/library/Folea-WSEAS-ICC2005.pdf, downloaded 2008, 1-6.

Bacon, S., "Avatars," http://www.ymessengerblog.com/blog/category/avatars/feed, downloaded 2008, 1-7.

PCT Application No. PCT/US2009/050606 : International Search Report and Written Opinion of the International Searching Authority, Feb. 25, 2010, 11 pages.

"Changing Avatar Appearance with Material Scripting," http://update.multiverse.net/wiki/index.php/Changing_Avatar_Appearance_With_Material_Scripting, downloaded 2008, 1-10.

"How to Change Your Avatar's Appearance in Second Life," http://www.ehow.com/how_2036822_change-avatars-appearance.html, downloaded 2008, 1-2.

"The Adventure," http://got.communicatenewmedia.com/track2.php?t=features, downloaded 2008, 1-2.

Alexa et al., "An Animation System for User Interface Agents," http://wscg.zcu.cz/wscg2001/Papers_2001/R342.pdf, downloaded 2008, 7 pages.

Andre, E. et al., "Exploiting Models of Personality and Emotions to Control the Behavior of Animated Interactive Agents", Downloaded from Internet Dec. 19, 2008, http://www.dfki.de, 5 pages.

Hayes-Roth, B. et al., "Improvisational Puppets, Actors, and Avatars", Computer Science Department, 2000, 10 pages.

Lee et al., "Interactive Control of Avatars Animated with Human Motion Data," http://graphics.cs.cmu.edu/projects/Avatar/avatar.pdf, downloaded 2008, 10 pages.

Lisetti, C.L. et al., "MAUI: a Multimodal Affective User Interface", Multimedia, 2002, http://delivery.acm.org, 161-170.

Roeder, L., "Create a Personalized Yahoo Avatar," Personal Web About.com, http://personalweb.about.com/od/hacksforprofiles/ss/yahooavatar_5.htm, Jun. 6, 2008, 2 pages.

U.S. Appl. No. 12/178,535, Final Office Action dated Dec. 29, 2011, 14 pages.

U.S. Appl. No. 12/178,535, Non-Final Office Action dated Aug. 31, 2011, 17 pages.

U.S. Appl. No. 12/189,067, Final Office Action dated Jul. 6, 2012, 12 pages.

U.S. Appl. No. 12/189,067, Non-Final Office Action dated Aug. 19, 2011, 8 pages.

Vilhjalmsson, H, H., "Autonomous Communicative Behaviors in Avatars", Submitted to the Program in Media Arts and Sciences, School of Architecture and Planning, MIT, Jun. 1997, 50 pages.

Wikipedia Web printout: "Need for Speed: Underground", printed on Aug. 25, 2011.

* cited by examiner

PROGRAMMING APIS FOR AN EXTENSIBLE AVATAR SYSTEM

PRIORITY

This application claims priority to U.S. Patent Application No. 61/080,626, entitled "Extensible Avatar System", filed on Jul. 14, 2008.

CROSS-REFERENCE

This application is related by subject matter to the subject matter disclosed in the following commonly assigned applications, the entirety of which are hereby incorporated by reference herein: U.S. patent application Ser. No. 12/178,535 titled "System for Editing an Avatar," U.S. patent application Ser. No. 12/184,990 titled "Avatar Items and Animations", and U.S. patent application Ser. No. 12/189,067, titled "Avatar Closet/Game Awarded Avatar."

BACKGROUND

Video games sometimes feature a user-created avatar as a user-controlled character. Typically, a user may customize the avatar in a variety of ways dealing with appearance, such as facial features and clothing. This allows the user a more personalized and involved video gaming experience. For instance, the NINTENDO CORPORATION® has a user-created avatar, the MII®, which a user may then use as his or her user-controlled character in video games that support this feature, such as WII SPORTS®.

While avatars may be created on the system, or in a particular game, it is often desirable for a user's created avatar to be available for use by various video game applications. For instance, players may desire that an avatar associated with the player be available for incorporation into new video game applications without having to recreate the avatar. Furthermore, it may be advantageous for the video game application to use the video game system's rendering functions and incorporate the rendered avatar into the game output rather than providing its own avatar rendering functions. In either situation, it would be advantageous for video game applications to be able to access application programming interfaces (APIs) that allow the applications to access avatar information into their own rendering functions, or to incorporate system rendered avatars into the application's outputs.

SUMMARY

In various embodiments of the present disclosure, a method, system and computer readable medium are provided to implement an API for programming avatars. Such an API may allow video game applications to retrieve structures of data which represent an avatar. The application can then take those structures and incorporate the data into their own character system so that they can render and animate the avatars in the application's context using the application's code.

An API may also allow applications to render an avatar to a render target, with the system handling the rendering and animation. The video game application can trigger animations or rely on "idle" animations to play, and the animations may be rendered to a two dimensional surface that the video game application may then present.

In some embodiments, the avatar system may be designed so that the API may deliver avatars accessorized (e.g. dressed) with accessories (e.g. t-shirts) that are released after the game itself has been released with no adverse effects on the video game application. Resources may be pre-allocated in such a fashion that new accessories do not occupy additional resources that the video game application is expecting to be available for other purposes.

In an embodiment, the avatar system may also be designed so that the retrieval of avatar assets may be executed by the console or online system, which may then be updated independently of the game application. This may allow the console or online service to change the logic for avatar asset retrieval without requiring changes to the game application. For example, while a console might initially retrieve assets only from local storage, in other cases assets may, for example, be retrieved from the internet.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included.

DETAILED DESCRIPTION

Avatar Systems

Figure 1:
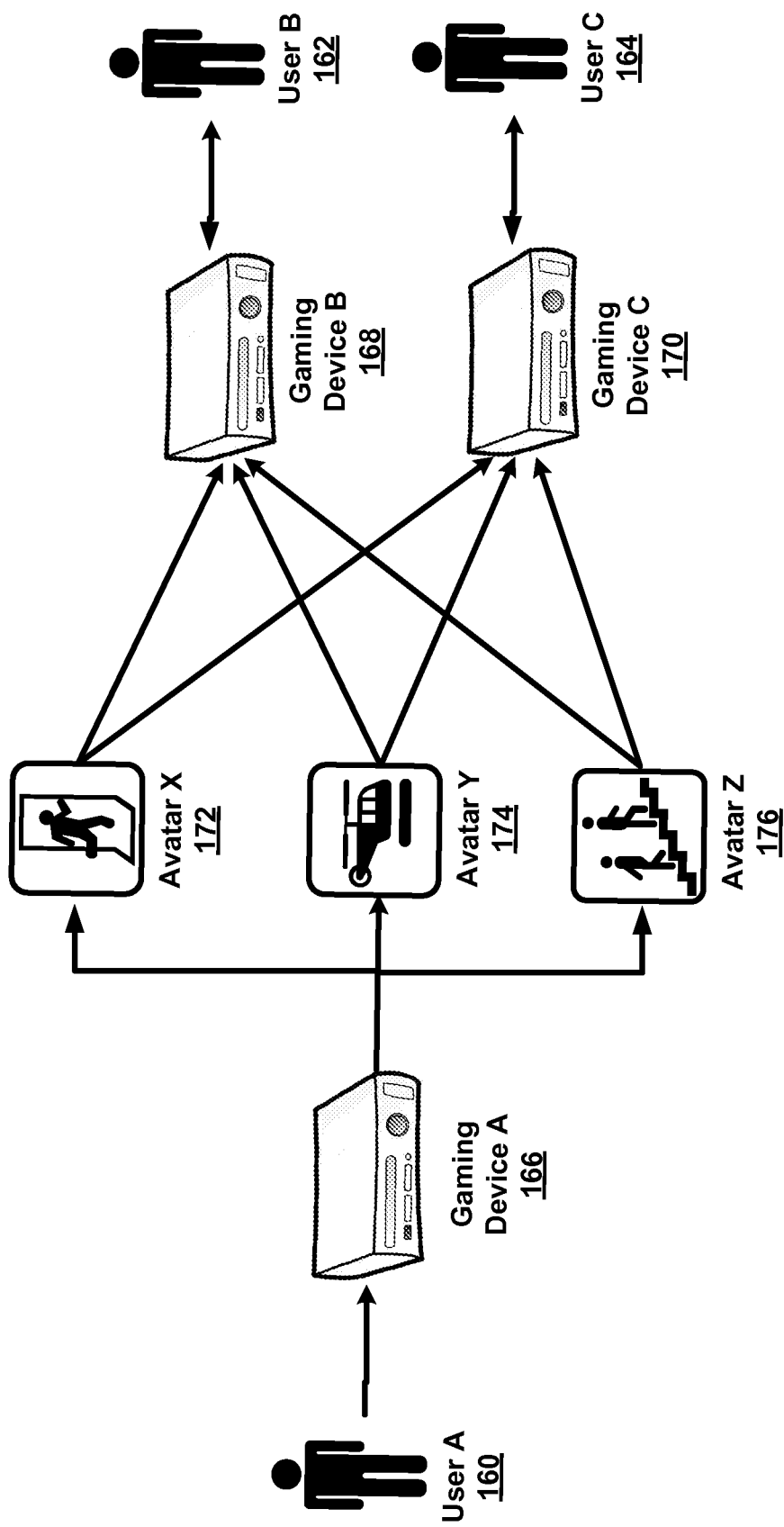
FIG. 1 illustrates that in some embodiments avatars and any associated items are static.

FIG. 1 illustrates a static avatar system. User A 160 may play a gaming console A 166, and in playing such a gaming console 166, the user 160 may have multiple avatars, such as avatar X 172, avatar Y 174, and avatar Z 176. These avatars 172, 174, 176 would typically be game specific. In other words, one game would allow the user 160 to select a first avatar 172, a second game would allow the user 160 to select a second avatar 174, a third game would allow the user 160 to select a third avatar 176, and so on.

In the case of online game playing, other users, such as user B 162 and user C 164 could interact with the first user 160 if such online game playing was mediated by a central server. In the example shown in FIG. 1, such avatars 172, 174, 176 that were associated with the first user 160 could be seen by the other users 162, 164, however, these avatars 172, 174, 176 have limited ability to be updated and animated.

Figure 2:
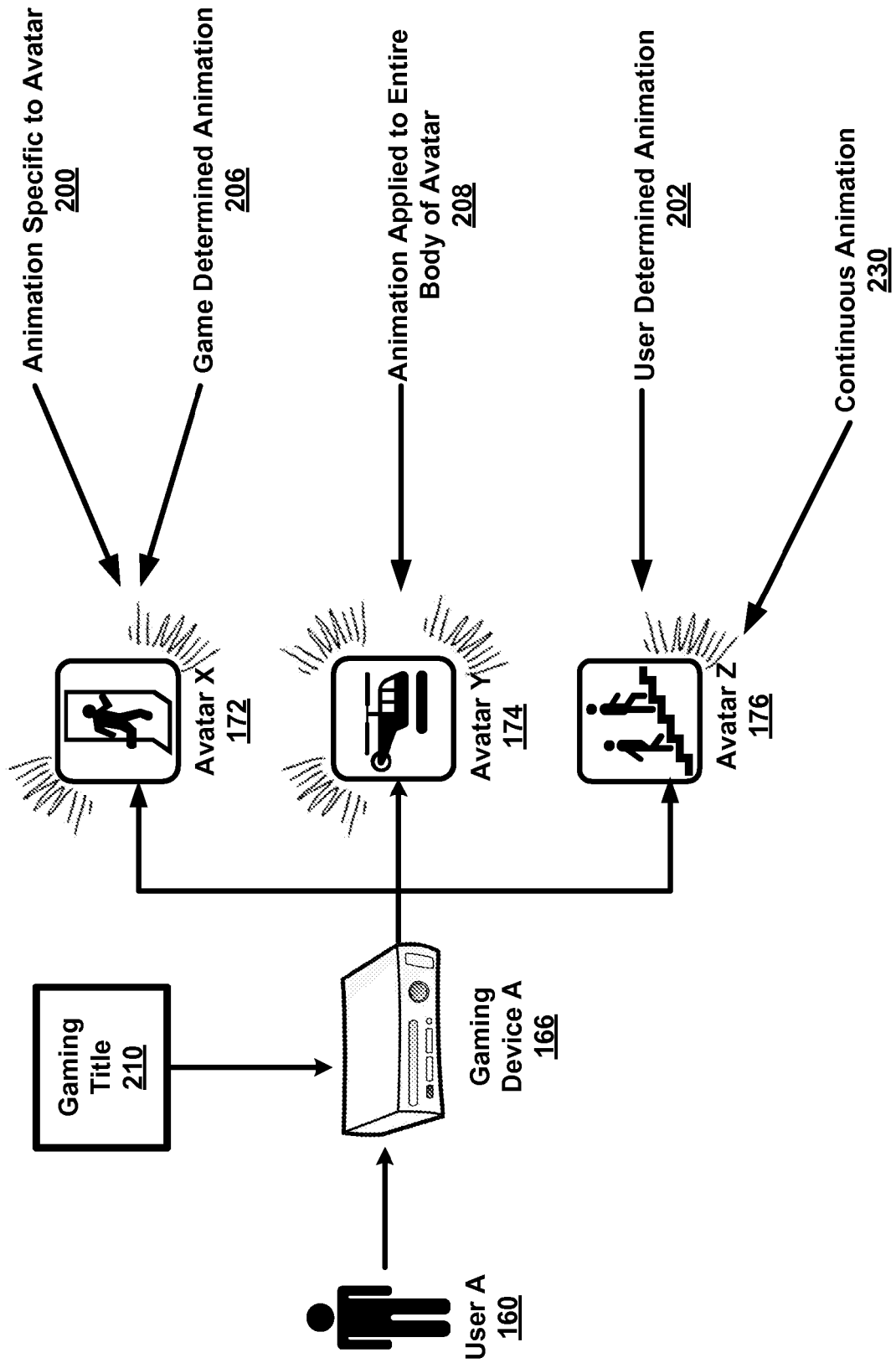
FIG. 2 illustrates that avatar items can be animated in a plurality of ways.

FIG. 2 illustrates that avatars can be animated in a plurality of ways. Specifically, avatars may be adorned or accessorized by "items," where an item is understood to be any piece of graphic and/or audio component that may be applied to an existing avatar. By way of example and not limitation, items may include hats, shoes, gloves (i.e., any piece of clothing), in which case such items may contain animations that are item specific—for example, a hat that keeps changing colors or moves about an avatar's head. Moreover, items may also apply to the entire avatar body—for example, the notion of dancing, smiling, or jumping may be applied to an avatar as a whole in order to add to the avatar's liveliness and presentability (or it may be added for other purposes).

In any event, FIG. 2 shows that in one aspect of the presently disclosed subject matter, avatar X 172 may have applied to it animation that is specific 200 to the avatar 174 (e.g. the hat example discussed above). On the other hand, avatar Y 174 may have animation that is applied to the entire body 208 of the avatar 174 (e.g. the dance example discussed above). In either case 172, 174, or in other cases 176, the avatars may be user determined 202 or they may be game determined 206. This means that users may accessorize the avatars 172, 174, 176 via some interface, or such avatars may be accessorized by gaming titles 210. In this latter scenario, if the user 160 is playing a game and unlocks an achievement in the game, the reward for such achievement may be animation items that then may be applied to the user's 160 avatars—whether to the avatars in a specific game or to the avatars in general for several (or all) games.

Figure 3:
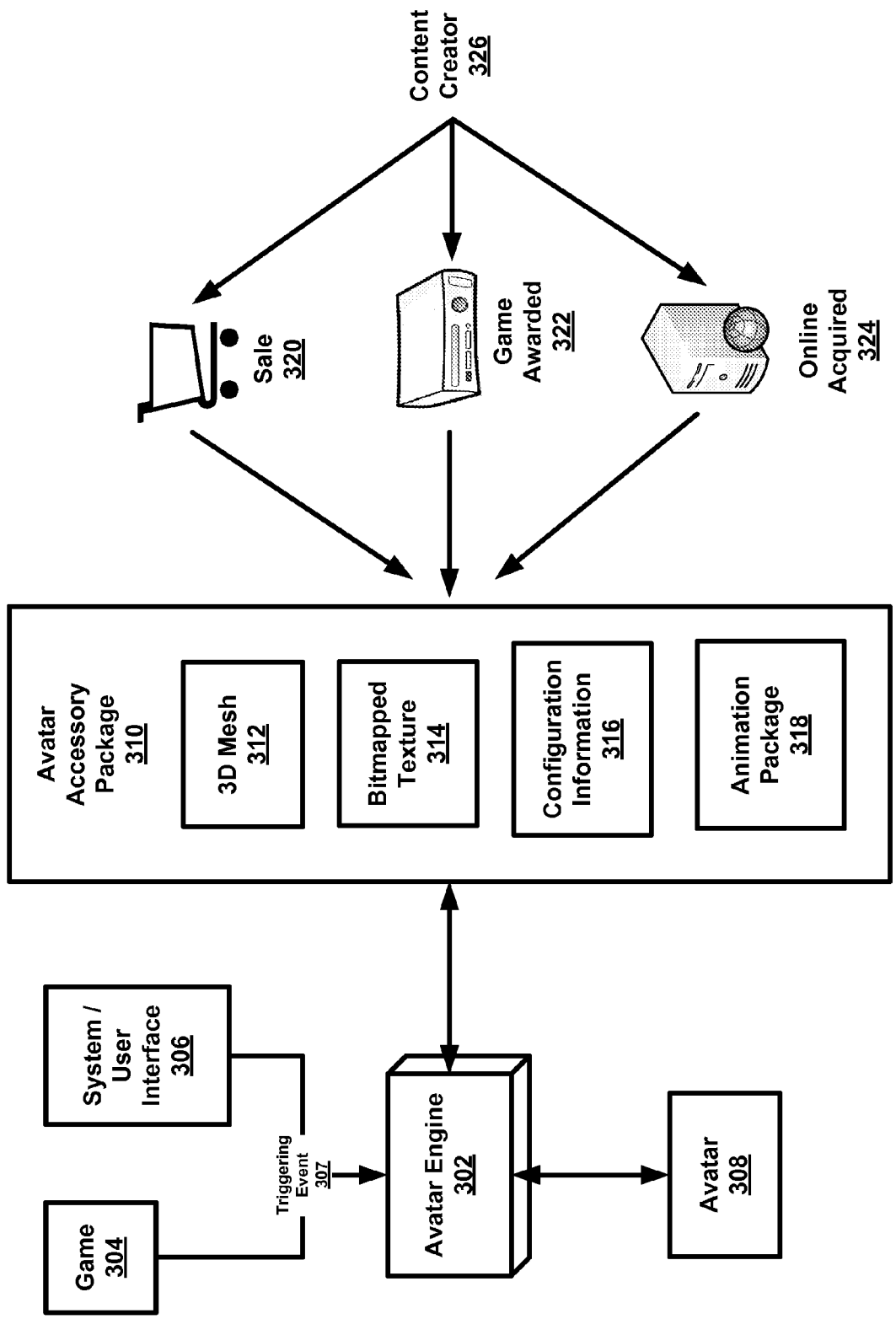
FIG. 3 illustrates an exemplary system that allows for avatar accessorizing using animated items.

FIG. 3 illustrates an exemplary system that allows for avatar accessorizing using animated items. In the following discussion, note also that the "accessory pack" contains other avatar assets outside of animations (e.g., clothing, facial features, etc.). An avatar engine 302 may be configured to apply accessory items to avatars 308. The accessory items may contained in a animation package 318 and be provided together with three dimensional meshes 312, bitmapped textures 314, configuration information (e.g. where the items should be placed in relation to the avatar 308). All this code and data could be part of an overall avatar accessory package 310. In short, the avatar engine 302 may access content in the avatar accessory package 310 and then apply this content to the actual avatar 308.

There may be various triggering mechanisms for applying such item content to avatars. For example, one such mechanism can include a user interface 306 that allows users to select which items to apply to which avatars. Alternatively (or in addition to), game titles 304 themselves can be a trigger for applying item content to avatars, depending on the implementation and user interaction with a gaming console hosting such an avatar engine 302. Yet, in other aspects of the present disclosure, the avatar engine 302 may reside on hosting server and any processing may be performed upstream from users.

FIG. 3 also shows that there may be various sources for the shown avatar accessory package 310. In addition to item content being provided by the game titles themselves 322, such content can be acquired from an online source 324 or it can be purchased from various sources (including games, servers, and other media). Thus, the avatar engine 302 can apply item content that was created by various content creators 326, as long as such creators are aware of standards expected by the avatar engine 302. However, universal (non-proprietary) standards may also be used, as those skilled in the art will readily appreciate.

Figure 4:
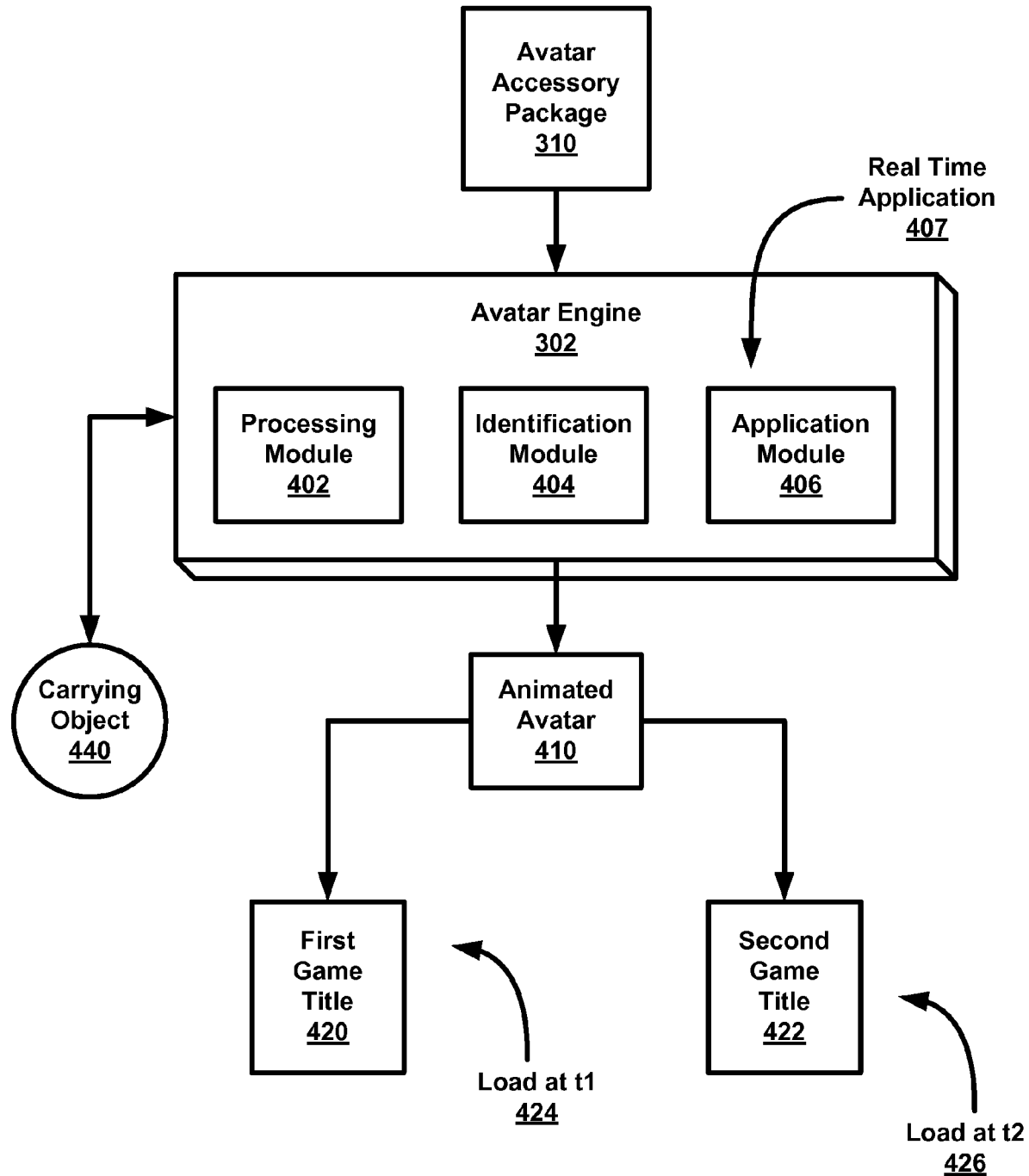
FIG. 4 illustrates a system for animating avatars across a plurality of games.

FIG. 4 illustrates a system for animating avatars across a plurality of games. Although a system is shown in FIG. 4, this subject matter can be practiced as a method and/or computer readable media (which is true of this figure with respect to any of the other figures, and vice versa). In FIG. 4, the above discussed avatar engine 302 may have various modules. The shown modules 402, 404, 406 are merely exemplary and non-limiting (as holds true for any of the present disclosure that is exemplary and non-limiting).

Thus, a system may be used for animating gaming console avatars in a plurality of different ways, where the system may be loaded in local computer memory and where it may be executed by a physical processor. In such a system, a processing module 402 may be configured to process an accessory package 310 containing a plurality of animation items. Another module, the identification module 404, may be configured to identify avatars and animation items from the plurality of animation items. And still another module, the application module 406, may be configured to apply the animation items to the avatars.

This system may accommodate various other aspects, such as having animation items applied to the avatars 410 at least in a first game title 420 and a second game title 422. Moreover, the animation items may be configured to be applied to the avatars 410 while the first game title 420 is playing 407. In other aspects, animation items may be further configured to be applied to the avatars 410 while the second game 422 title is playing 407. The first game title 420 and the second game title 422 may be distinct from each other in that they may be loaded separately, at time t1 424 and at time t2 426.

Figure 5:
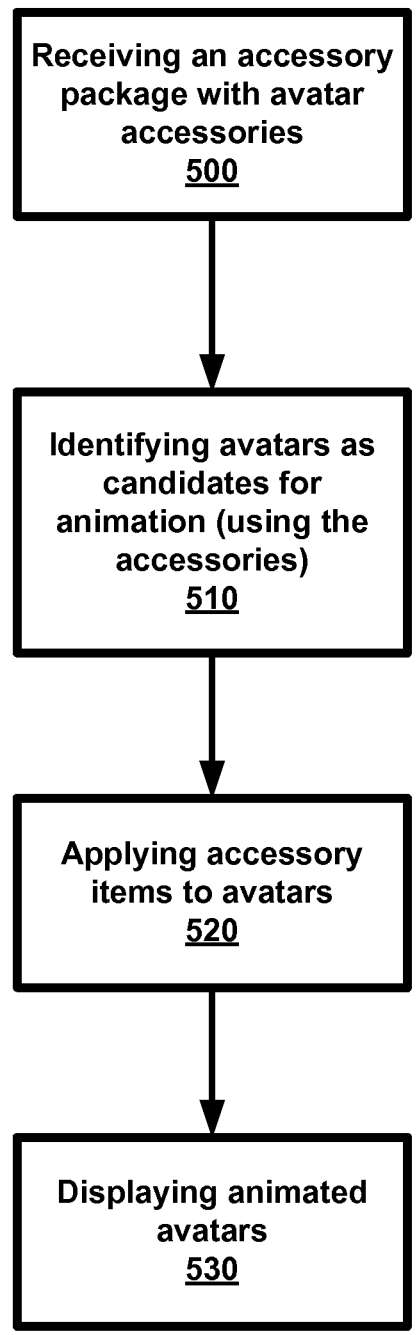
FIG. 5 illustrates an exemplary method for implementing the presently disclosed subject matter.

FIG. 5 illustrates an exemplary method where a step is performed comprising receiving an accessory package with avatar accessories 500. The next step may be identifying avatars as candidates for animation 510, and then applying accessory items to avatars. The final step may be actually displaying animated avatars 530. These steps can be used with the disclosure provided above, such as the avatar accessories may comprise of a plurality of items that are applicable to an avatar, the avatar may be an object corresponding to a user of a gaming console, and at least one of the plurality of items may be configured to be animated when applied to said avatar. Moreover, triggering events may be used, avatars may be applied at least across two distinct game titles (e.g. loaded separately), avatars may be accessorized in real time during game play, avatars may be continuously animated during a game (or they may pause as times), and so on.

Figure 6:
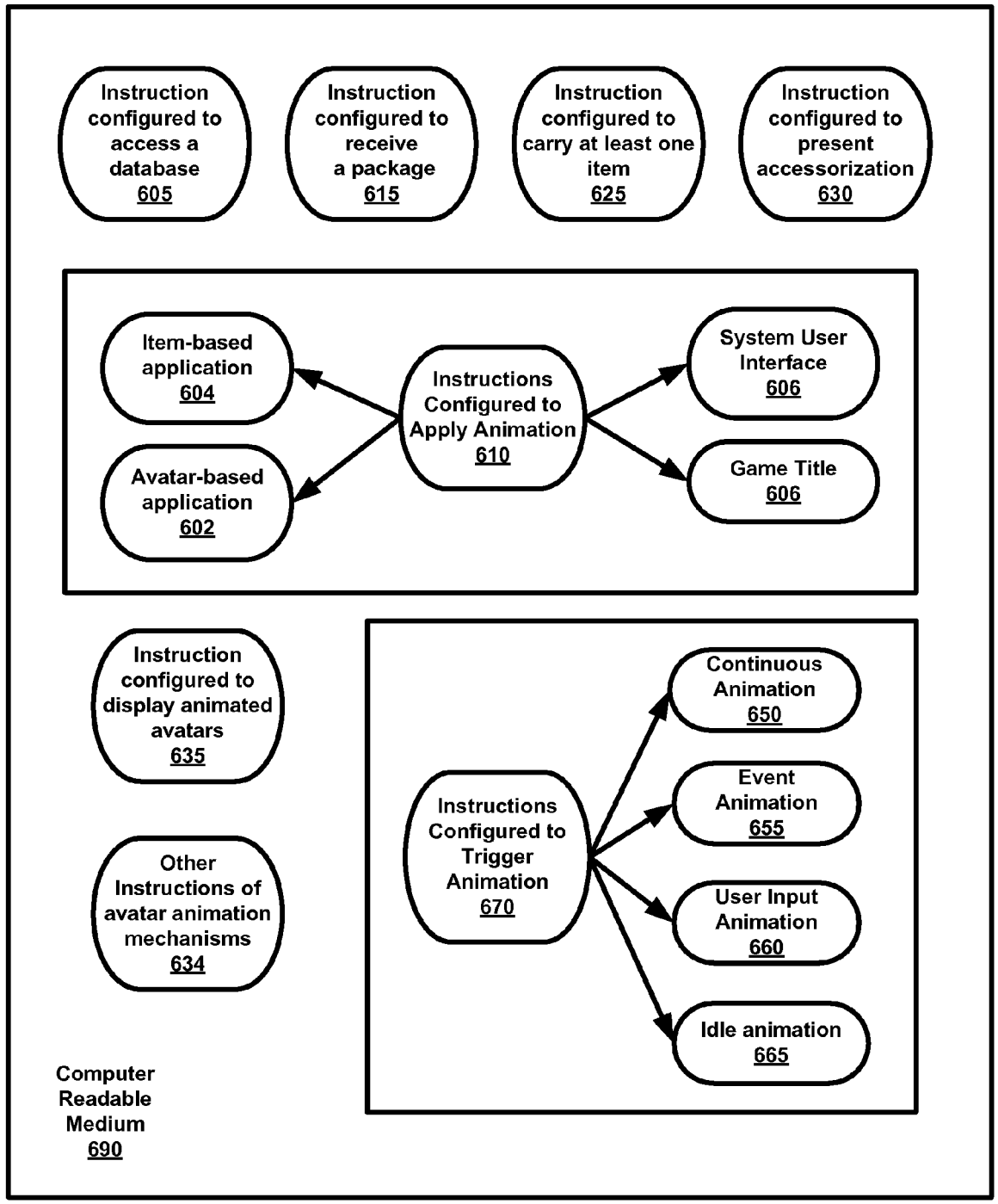
FIG. 6 illustrates an exemplary computer readable medium for implementing the presently disclosed subject matter.

FIG. 6 illustrates an exemplary computer readable medium 690 storing thereon various computer executable instructions. This medium 690 can be implemented as a system or practiced as a method, thus the present disclosure discussing computer readable media is merely exemplary. A plurality of instructions may be employed in order to accessorized avatars with items. Instructions for accessing 605 a database may allow for downloading of avatar accessorization content from remote databases; instructions for receiving 615 packages can process or unwrap any such accessorization content wrapped up in packages; instructions that apply 610 accessories to avatars may allow users to setup the look and feel of avatars in a desired manner; instructions that display animated avatars can be used to display this content on a variety of different media, such as monitors, cell phones, and so on.

It will be readily appreciated that other instructions may be used in conjunction with the aspects discussed above, such as: instructions configured to carry at least one item between or across different game titles 625; instructions configured to present to a user the option of accessorizing any avatars during the execution of games 630; instructions configured to trigger and manage animation in different ways 670, such continuous 650, event 655, user 660, and idle 665 animation; instructions configured to apply animation in specific ways 610, such as item-based 604 and avatar-based 602, or using different mechanisms, such as user interface 606 and game titles 608. It should be noted that other instructions 635 that embody the various aspect discussed above may be used.

Figure 7:
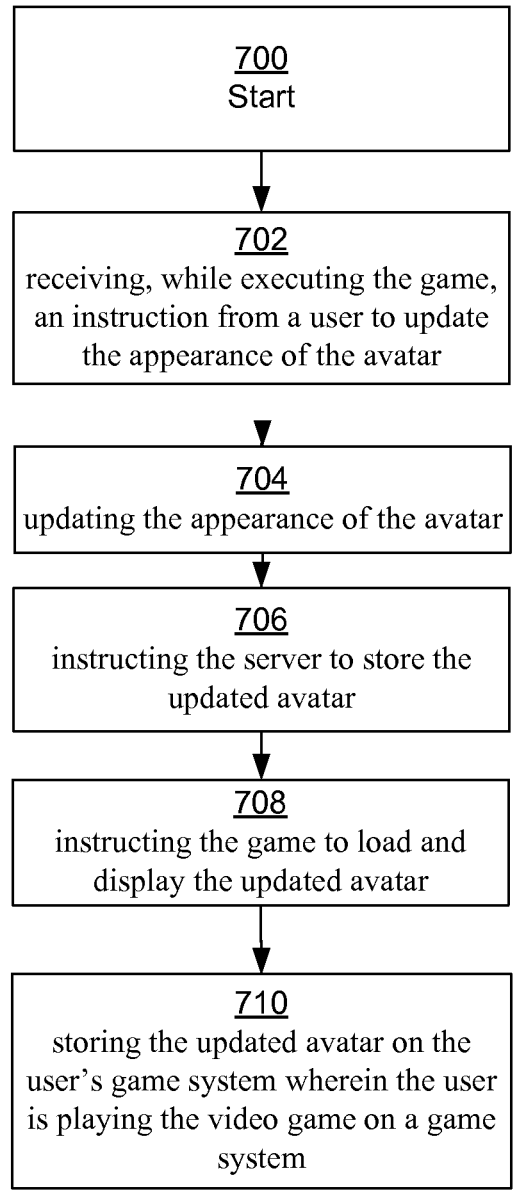
FIG. 7 illustrates an example procedure for updating the appearance of an avatar across an online video game service.

FIG. 7 illustrates an example operational flow for updating the appearance of an avatar across an online video game service, wherein said service comprises a server and an executing video game. Those skilled in the art will note that the disclosed process is illustrative and that different implementations are contemplated.

At 700, the process flow begins. This process may be triggered in response to a user beginning execution of a video game on a video game console that is connected to the online video game service. For example, the user may power on the console, insert a disc that contains computer readable instructions comprising the game, and send an access credential that uniquely The service itself may comprise one or more servers through which online-multiplayer video game play is validated and exchanged between users, a game match-making service that groups users together into a gaming session, an e-commerce marketplace, a message board and a live chat room. The user's avatar may appear in many areas of such a service. For instance it may appear in a user's profile on the service or as a part of any posts the user makes to a message board.

Operation 702 depicts receiving, while executing the game, an instruction from a user to update the appearance of the avatar. While the user is playing the game, he or she may be inspired to change the avatar's appearance. In such an instance, the user may enter a command that calls up an avatar editing screen. For example, the user may press a dedicated button on his or her controller, keyboard or other input device, which brings up a list of commands to be performed. From there, the user may select the command corresponding to editing the appearance of the avatar. While these commands are being entered, the action in the underlying game may continue on or be suspended. The choice between those two options may be made either by the system the game is executing on or by computer readable instructions in the game itself. In one embodiment, receiving an instruction from a user to update the appearance of the avatar includes suspending active play of the game.

Operation 704 depicts updating the appearance of the avatar. The appearance may be any physical aspect of the avatar, such as a hair color, a hair length, a hair style, a facial hair color, a facial hair length, a facial hair style, a facial hair position, an eye color, an eye style, an eye position, a nose style, a nose position, a mouth style, a mouth color, a mouth position, an ear style, an ear position, a skin color, a height, a weight, or a body build.

In an embodiment, updating the appearance of the avatar includes overlaying an editor window on top of the game, and receiving at least one instruction from the user on how to update the appearance of the avatar. For example, the mechanics of updating the avatar may be controlled by the system that the user is playing the game on, rather than the game itself, and the system may render the editor window over the game window before sending the rendered frame to the user's visual display device. When presented with such a window, the user may then send an instruction on how the avatar is to be updated. For instance, the user may click on the avatar's eyes, then select a new eye color from a list of available colors, changing the avatar's eye color from green to hazel.

Operation 706 depicts instructing the server to store the updated avatar. This may include displaying an error message to the server when an indication from the server that it stored the updated avatar is not received within a period of time. Where the server is connected to the user's game system over a communications network, there may be times where the user updates the avatar but the communications network fails to send the updated avatar to the server. In such a case, the user may typically appreciate notification that the changes made to the avatar were not saved. In another embodiment, the changes may be saved locally on the user's game system and further attempts to send the updated avatar to the server may be made until such sending is successful.

Operation 708 depicts instructing the game to load and display the updated avatar. Where the sole non-volatile storage medium for an avatar exists on the server, this may include instructing the game to receive the updated avatar from the server. In another embodiment, the game may read the updated avatar directly from local memory. In the embodiment where the user is playing an online-multi-player video game comprising a session and a plurality of other users participating in said session, and said instructing the game to load and display the updated avatar may include instructing each other user's video game to load and display the updated avatar. That way, the user's avatar will have a consistent appearance for all participants in the multi-player game. This may also include instructing each other user's video game to load the updated avatar after play has been suspended for all other users of the session. It may be confusing to another user when the user's avatar suddenly changes during game play, and a malicious user may rapidly change the appearance of his or her avatar to annoy other users. This can be avoided where avatar changes propagate to all users only when play has been suspended, such as when a match concludes, or all players are paused. This said instructing each other user's video game to load the updated avatar may also include notifying each other user that the user's avatar has been updated. It may be confusing for another user if the user's avatar changes without explicit indication of such, and a notification, such as a pop-up window stating this change, may mitigate this problem.

Operation 710 depicts the optional step of storing the updated avatar on the user's game system wherein the user is playing the video game on a game system. Where communications with the server occur slowly, storing the avatar locally may improve the user experience by speeding up load times.

Figure 8:
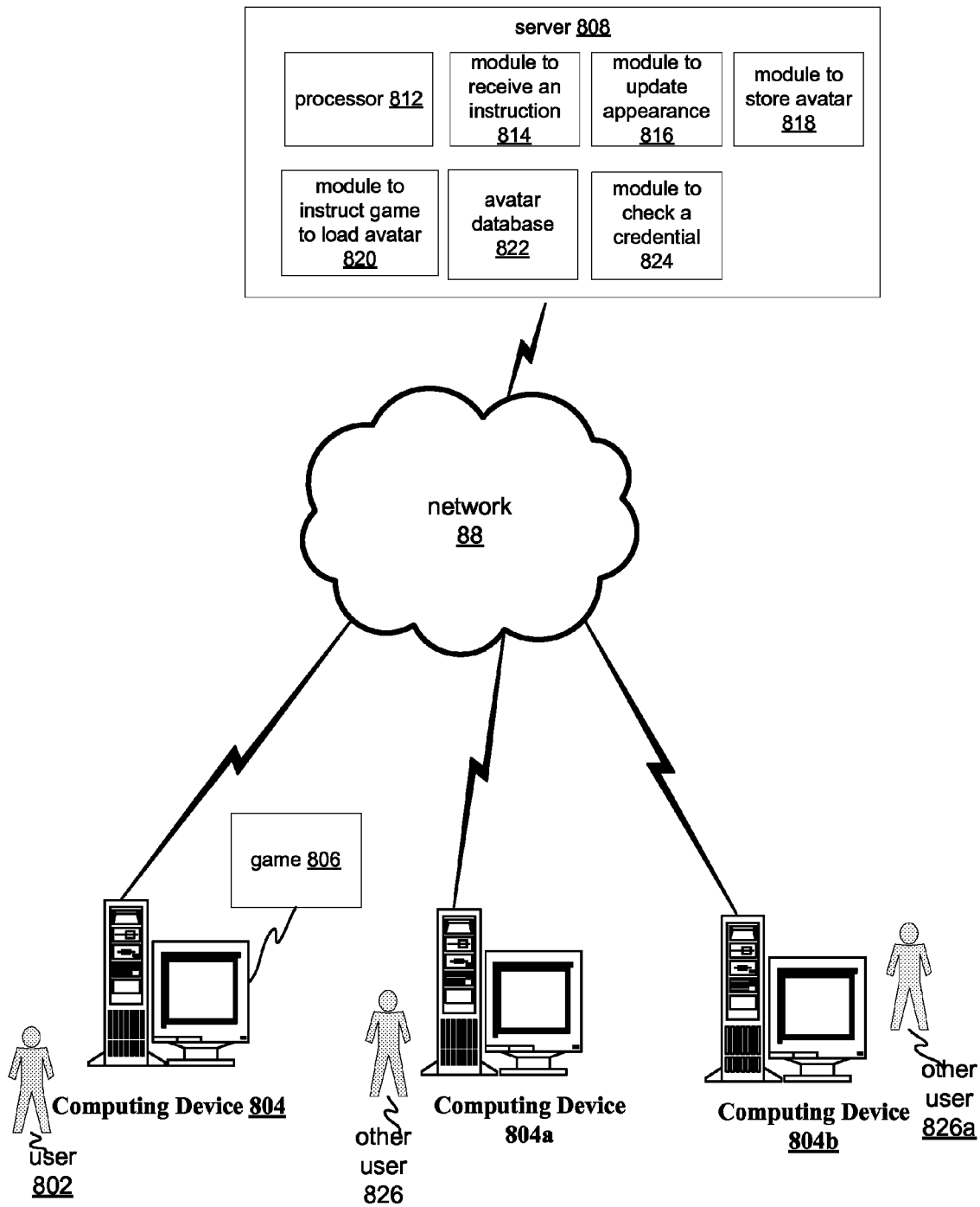
FIG. 8 illustrates an example system for updating the appearance of an avatar across an online video game service.

FIG. 8 depicts a system for updating the appearance of an avatar across an online video game service, wherein said service comprises a server and an executing video game. Those skilled in the art will note that the disclosed process is illustrative and that different implementations are contemplated.

A user 802 uses a computing device 804 to execute a game 806. In an embodiment of the present disclosure, the user connects to an online gaming server 808 through a network 88.

The server 808 comprises a processor 812, a module to receive an instruction from a user to update the appearance of the avatar 814, a module to update the appearance of the avatar 816, a module to store the updated avatar 818, a module to instruct the user's game to load and display the updated avatar 820, a database in which to store an avatar/user pairs 822, and a module to check at least one credential 824.

The computing device 804 may be a dedicated video game console or a more general computing device, such as a cellular telephone or a personal computer. The computing device 804 may be configured to execute a plurality of games. It may have an optical drive and allow for a variety of games to be executed from computer readable instructions stored on optical discs. The games may be stored on a storage device within the computer, such as a hard drive or solid-state drive.

Where the user 802 wishes to update the appearance of the avatar he is using in a video game 806 that he is currently playing, he or she may issue an instruction to the server 808 to update the appearance of said avatar, which is received by the module to receive an instruction from a user to update the appearance of the avatar 814. That instruction is then passed to the module to update the appearance of the avatar 816. When the appearance of the avatar has been updated, a signal is sent from that module 816, to the module to store the updated avatar 816, which stores said avatar in the database 822. The database 822 may store pairs that identify the user and said avatar. Where a user may have a plurality of avatars at one time, the database may store the user and the avatars separately, along with an indication of which avatar corresponds to which user. The module to update the appearance of the avatar 816 also sends a signal to the a module to instruct the user's game to load and display the updated avatar 820, which sends a message to the user's computing device 804 to instruct the game 806 to load and display the updated avatar.

Where a security system is in place, the server may also pass all communications from the user 802 to update the appearance of the avatar through a module to check at least one credential of the user. Where the credential check passes, the user's instruction is processed as above. Where the credential check fails, the user's instruction is not executed. In an embodiment, a message telling the user 802 that the credential check failed may be send to the user's console 804 for display to the user.

Where the user 802 updates the avatar while playing on the service with other users 826a, 826b, through their respective computing devices 804a, 804b, when the server 808 sends a message to the user's console 804 to load and display the user's updated avatar, it may send a message to the other users' consoles 804a, 1204b to also load and display the user's updated avatar.

Figure 9:
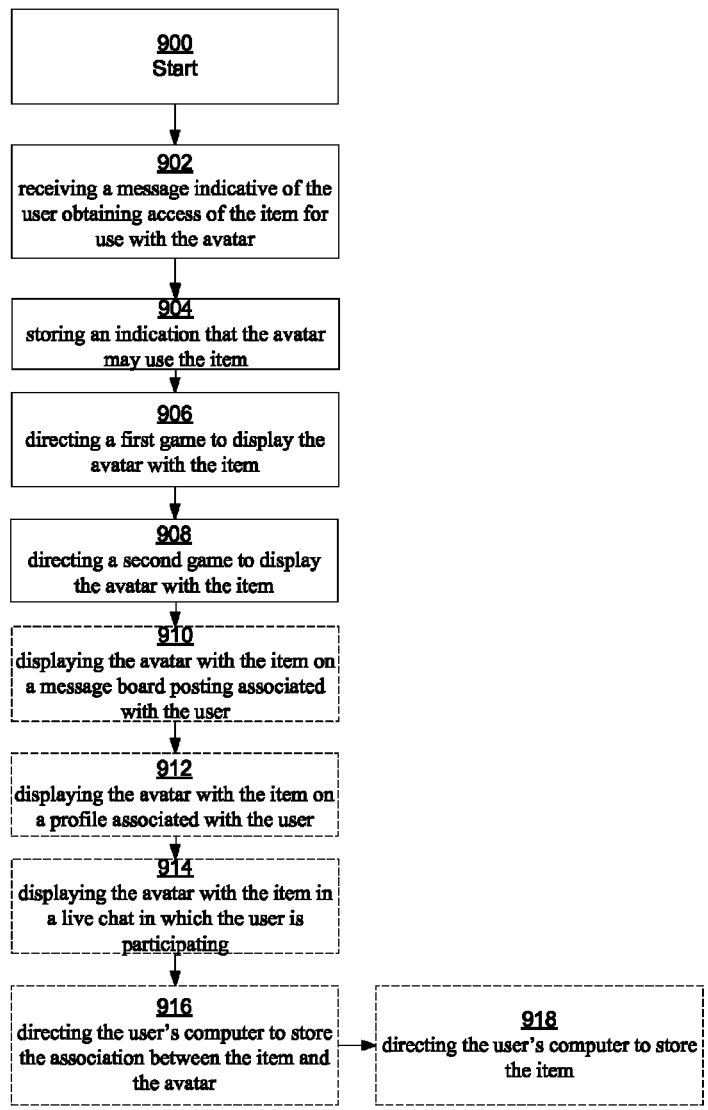
FIG. 9 illustrates an example procedure for dynamically adding an item associated with an avatar associated with a user in an online multi-player video game service.

FIG. 9 illustrates an example operational flow for dynamically adding an item associated with an avatar associated with a user in an online multi-player video game service. Those skilled in the art will note that the disclosed process is illustrative and that different implementations are contemplated.

At 900, the process flow begins. This process may be triggered in response to a user beginning execution of a video game on a video game console that is connected to the online video game service. For example, the user may power on the console, insert a disc that contains computer readable instructions comprising the game, and send an access credential that uniquely The service itself may comprise one or more servers through which online-multiplayer video game play is validated and exchanged between users, a game match-making service that groups users together into a gaming session, an e-commerce marketplace, a message board and a live chat room. The user's avatar may appear in many areas of such a service. For instance it may appear in a user's profile on the service or as a part of any posts the user makes to a message board.

Operation 902 depicts receiving a message indicative of the user obtaining access of the item for use with the avatar. For example the message may be received from the game when the user achieves an accomplishment in the game associated with the item. The accomplishment may be, for instance, beating a level or purchasing it in the game with in-game currency. The message may be received in response to the user purchasing the item from an e-commerce store that is associated with the service. For example, the message may be received in response to the user receiving the item as a gift. For example, a sponsor could allow users access to an item comprising shoes that look like actual shoes that the sponsor produces.

This operation may include the case wherein the item has a creator, and said receiving a message indicative of the user obtaining access occurs after receiving a message from the item creator to store the item. In some cases, the item may be created by a game developer outside of the service. Where that is true, the item creator may send a message to the service indicating that the item is to be stored by the service for future use by users with their avatar.

In some instances the creator has at least one credential, the message includes the credential, and receiving the message from the item creator to store the item includes validating each credential.

Operation 904 depicts storing an indication that the avatar may use the item. Where an embodiment contains a database in which are stored avatars and items, the indication may comprise a third field, such that for every avatar-item pair, there is a corresponding "May use?" field that indicates either "yes" or no.

Operation 906 depicts directing a first game to display the avatar with the item. Where the item comprises a hat, said displaying may comprise having the avatar wear the hat on his or her head where the avatar is displayed. Where the item is a non-clothing accessory, such as a fly swatter or a giant foam "We're #1" novelty hand, said displaying may comprise having the avatar holding or otherwise manipulating the item where the avatar is displayed.

In an embodiment, said directing the first game to display the avatar with the item includes receiving a message from the user to display the avatar with the item.

In an embodiment, said first game is an online multi-player game comprising a session and at least one other user. An online gaming service may have many sessions or instances of a particular game active at a single time. Typically, a user participates in no more than a single session of the game at any time. In such an embodiment, said directing the first game to display the avatar with the item includes directing the game of each other user to display the avatar with the item. This will cause each other user who is playing the session with the user to see the updated avatar. This will ensure consistency for all users in the gaming session.

In an embodiment, said directing a first game to display the avatar with the item includes directing the first game to download the item from at least one server. In an architecture where all items are stored on a server, and a subset of the items are stored on the user's computing device, the first game may require local access to the item.

Operation 908 depicts directing a second game to display the avatar with the item. The avatar exists across the entire service, so while an item may be obtained in the first game, it is available for the avatar in all other aspects of the service. Where the user obtains an item for his or her avatar, directs that his or her avatar be displayed with the item, then begins playing a second game that supports avatars, the avatar will be displayed with the item in the second game, as well.

Operation 910 depicts the optional step of displaying the avatar with the item on a message board posting associated with the user. Where the service comprises a message board, users may post to the board to communicate with each other. Attached to each post may be the user's name, the time at which the post was made, and a representation of the user's avatar. The representation may comprise less than the entire avatar, such as a still image of the avatar from the neck up facing forward. Where the user's avatar is displayed with the user's message board posts and the user has set the avatar to be displayed with the item, in an embodiment the image of the user's avatar corresponding to the message board posting includes the item.

Operation 912 depicts the optional step of displaying the avatar with the item on a profile associated with the user. A profile comprises information about the user, such as real name, home page, age, interests, and a personal quote. Where the service comprises a user profile, the profile may comprise a representation of the user's avatar. The representation may comprise less than the entire avatar, such as a still image of the avatar from the neck up facing forward. Where the user's avatar is displayed in the user's profile and the user has set the avatar to be displayed with the item, in an embodiment the image of the user's avatar corresponding to the message board posting includes the item.

Operation 914 depicts the optional step of displaying the avatar with the item in a live chat in which the user is participating. A live chat comprises a communications session where a plurality of users communicate with each other in near-real-time. It may comprise text, audio, video or some combination thereof. In an embodiment, where the user participates in a live chat, all participants in the chat see a representation of the user's avatar. The representation may comprise less than the entire avatar, such as a still image of the avatar from the neck up facing forward. Where the user's avatar is displayed in the user's profile and the user has set the avatar to be displayed with the item, in an embodiment the image of the user's avatar corresponding to the message board posting includes the item.

Operation 916 depicts the optional step of directing the user's computer to store the association between the item and the avatar, wherein the user accesses the service through a computer. It may be beneficial for the user's computer to store the association between the item and the avatar so as to reduce access time by storing the information locally.

Operation 918 depicts the optional step of directing the user's computer to store the item, wherein the user accesses the service through a computer. It may be beneficial for the user's computer to store the item itself so as to reduce access time by storing the information locally.

Figure 10:
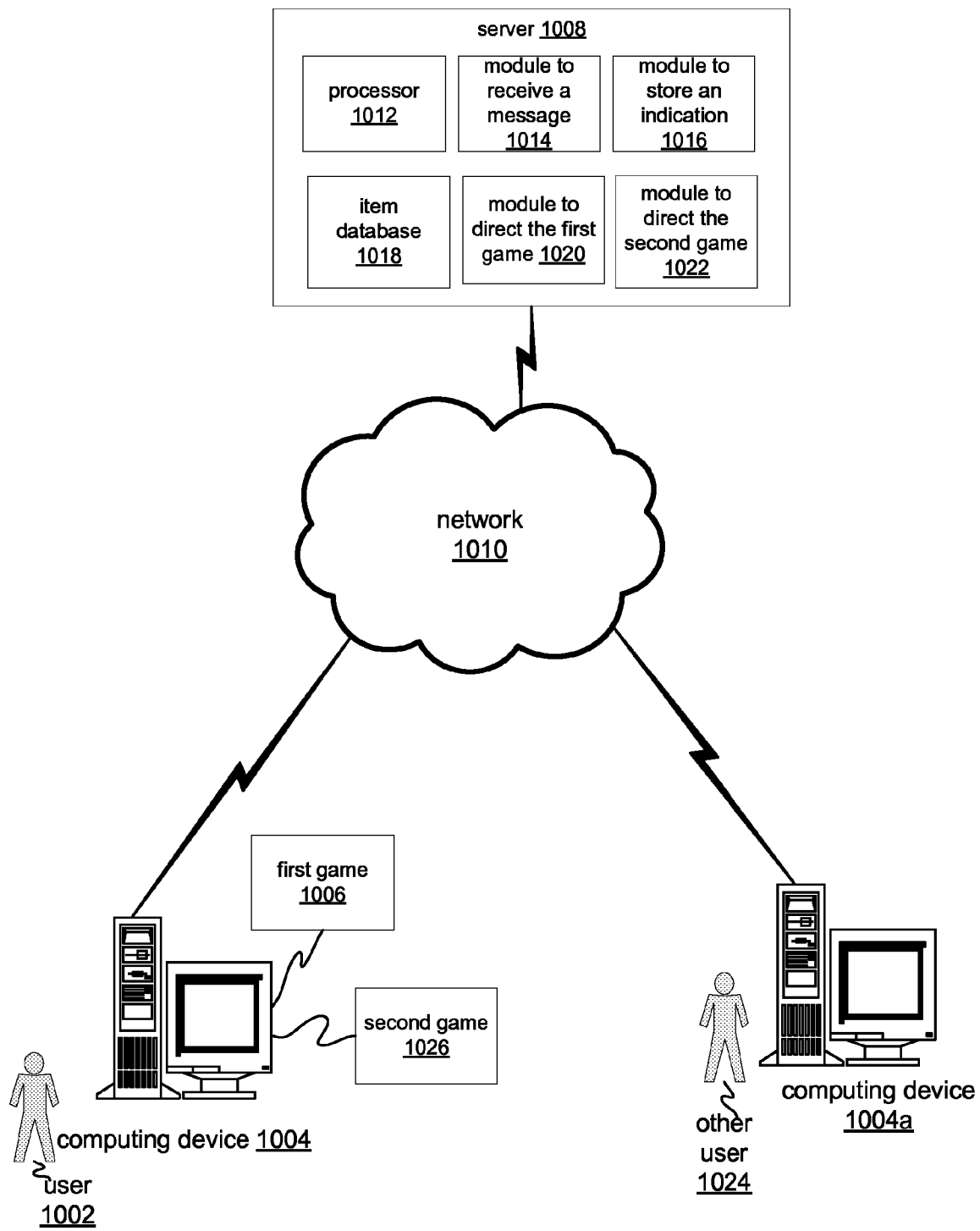
FIG. 10 illustrates an example system for dynamically adding an item associated with an avatar associated with a user in an online multi-player video game service.

FIG. 10 depicts a system for dynamically adding an item associated with an avatar associated with a user in an online multi-player video game service. Those skilled in the art will note that the disclosed process is illustrative and that different implementations are contemplated.

A user 1002 uses a computing device 1004 to execute a game 1006. In an embodiment of the present disclosure, the user connects to an online gaming server 1008 through a network 1010.

The server 1008 comprises a processor 1012, a module to receive a message indicative of the user obtaining access of the item for use with the avatar 1014, a module to store an indication that the avatar may use the item 1016, a database to store user/avatar/item triplets 1018, a module to direct a first game to display the avatar with the item 1020, and a module to direct a second game to display the avatar with the item 1022.

The computing device 1004 may be a dedicated video game console or a more general computing device, such as a cellular telephone or a personal computer. The computing device 1004 may be configured to execute a plurality of games. It may have an optical drive and allow for a variety of games to be executed from computer readable instructions stored on optical discs. The games may be stored on a storage device within the computer, such as a hard drive or solid-state drive.

The user may obtain access to an item with his or her avatar. The user may obtain this from a variety of sources. It may be a gift from another user 1024, who is accessing the service through a computing device 1004a. The user may obtain the item as a reward by achieving a goal in the game 1006 associated with the avatar, such as beating a level or obtaining a threshold score. The user may also purchase the item from a e-commerce marketplace offered by the server 1008.

When the user has obtained access to the item, a corresponding message is sent to the module to receive a message indicative of the user obtaining access of the item for use with the avatar 1014. In an embodiment, said module 1014 includes a module to receive a message from the user 1002 to display the avatar with the item. In an embodiment, said module to receive 1014 is configured to receive the message from the first game 1006. Said module 1014 processes the message and then send a message to the module to store an indication that the avatar may use the item 1016. That module 1016 stores said indication in the database 1018. In an embodiment, a user may have a plurality of avatars, and the item is restricted to a single avatar. In an embodiment, when a user obtains access to an item and may have a plurality of avatars, the item may immediately be used by all of the user's avatars. In an embodiment, the user has a single avatar, and all items that the user obtains access to correspond to that one avatar.

The module to direct a first game to display the avatar with the item 1020 sends a message indicative of such to the first game 1006 via the user's computing device 1004 through the network 1010. The first game 1006 receives the message and displays the user's avatar with the item.

Where the user later plays a second game, the module to direct a second game to display the avatar with the item 1022 sends a message indicative of such to the second game 1026 via the user's computing device 1004 through the network 1010. The second game 1026 receives the message and displays the user's avatar with the item.

Programming API

In various embodiments, video game applications may use a set of programming APIs that enable incorporation of avatars into the video game application. APIs may allow video game applications to retrieve structures of data which represent an avatar. In one embodiment, the video game application can then take those structures and incorporate the data into their own three dimensional character system so that they can render and animate the avatars in the game's own three dimensional environment using the game's own code. APIs may also allow video game applications to render an avatar to a render target or texture, with the host system or application performing all rendering and animation functions. The video game application may trigger animations, or rely on an "idle" animation to play, but they may be rendered to a two dimensional surface that the video game application may then present.

In an embodiment, an API may allow a video game application to access a full-body static shot of the avatar that may be saved with a user's profile. Typically, a video game application can retrieve a user's gamer picture and use that picture as the user's representation in the game. However, the picture will typically be a small (e.g., 64×64 or 32×32) image. In one embodiment, a video game application may access a larger display of the avatar, such as a full-body static image, without using the rendered/moving avatars.

In an embodiment, the API family and the relevant system components may allow newer avatar accessories to be released after the release of the game. The new avatars may still appear in the game regardless of which API family is being used. The APIs may deliver avatars accessorized (e.g. dressed) with accessories (e.g. t-shirts) that are released after the game itself has been released, with little or no adverse affect on the video game application.

In further embodiments, components of the API may be part of a video game platform, for example in the game console, and may be updated independently of the video game application to change the asset retrieval logic. The host system or platform may provide a host application that executes in conjunction with the video game application, providing various services and providing access to information and resources via the API. The avatar system may be designed so that the retrieval of avatar assets may be performed by the host system or application, the specific logic which may be updated independently of the title. The logic for avatar asset retrieval may thus be changed at a later time. For example, while assets may initially be retrieved from local storage, the system may be updated to retrieve assets from the internet Resources may thus be pre-allocated in such a fashion that newer accessories do not occupy additional resources that the video game application is expecting to be available.

In an embodiment, a video game application may use one or both of two API families: one of which allows the video game application to receive raw data to construct, render and animate the avatar themselves; the other in which the system renders an animated avatar to a destination provided by the video game application.

As mentioned above, one group of APIs can be used by video game applications to retrieve either raw data which can be used by the game's own code to construct, render and animate avatars in their own three dimensional environment. Another group of APIs can be used to render given users' avatars to desired render targets or textures.

If some of the code runs in the system, rather than in the video game application, the internal behavior of these APIs can be updated after release, allowing, for example, alternate retrieval mechanisms to be used.

The following exemplary description of an avatar API may be better understood in conjunction with the exemplary functions provided in the Appendix. While the described API discloses one embodiment, those skilled in the art will understand that many such implementations may embody the disclosed principles. Support for avatars in the API may include two interfaces: IXAvatarRenderer may be used by developers to render an avatar into a given device. Developers may use IXAvatarAnimation to move the parts of an avatar through a predetermined series of movements. Functions for creating IXAvatarRenderer objects and retrieving IXAvatarAnimation objects may be included in the API. Developers who render avatars using their own game engine may use the XAvatarGetAssets function to retrieve the low-level description of an avatar.

Video game applications may use avatars by retrieving avatar data and then rendering the avatar to a device. Video game applications may use the IXAvatarRenderer interface to perform the rendering, or they may load the avatar data using XAvatarGetAssets and then render the data themselves.

Avatars may be available in both male and female versions, although the same skeleton may be used for both thus making animations easier to design. Facial animation may be done by animating textures. For example, eye textures may have five different directions (up, down, left, right and center), and eye motion may be accomplished by switching textures to look in different directions.

Height and body weight may be controlled by linearly scaling joints in the skeleton from the middle "standard." The scaling factor may be varied as desired by the system.

Video game applications may use avatars to represent players. In multiplayer games, the avatar may be shown in the "game lobby" or other suitable application next to other information about the player. In games where it is appropriate, the avatar may be used in actual game play to represent the player.

The avatar system is not only useful for representing players' avatars, but since avatars appear as humans, the avatar system may also be used to render human, non-player characters in a game, including spectators, extras, game show hosts, and the like. Video game applications may request randomly generated avatars, so that no two crowds will look the same. Video game applications may load the avatars of signed-out profiles on the console to show a player's family's avatars proudly looking on at the end of a race, or cheering the player from the sidelines.

Avatars are typically intended to provide a broadly appealing experience to gamers of various demographic groups. For example, avatars may represent the player's identity, as on a game lobby, but may also adhere to rating systems such as the Entertainment Software Rating Board's (ESRB) "E10" rating. Similarly, the animation style used for avatars may be rational and naturalistic, and avatar movement may be dynamic and smooth.

A typical technical consideration in a video game application's use of avatars is how the avatars will be rendered and animated. The avatar system may include a built-in renderer that can be used in video game applications that wish to incorporate an avatar into their existing engine. The built-in renderer may support the use of predefined animations. Video game applications that already have a sophisticated rendering engine may prefer to access the raw avatar data and to render and animate the avatar using their existing engine.

Integrating avatars into a video game application may be designed to be straightforward, with predictable, fixed resource requirements and a simple API. A video game application may typically use about 850 kB at runtime to render one avatar, and some additional, temporary memory when retrieving the avatar data. It should be clear to those skilled in the art that the various embodiments of an avatar system and API disclosed herein are exemplary and that other implementations are possible.

In an embodiment, video game applications that use the XAvatar API may do so by linking to xavatar.lib. Video game applications may call XAvatarInitialize before they call any of the other functions in the library. This function allocates approximately two megabytes of heap memory for an asset retrieval cache, plus approximately 500 kilobytes of additional heap memory if the IXAvatarRenderer will be used.

In an embodiment, metadata may be a binary blob that contains information about the avatar's composition. Video game applications may use the XAvatarGetMetadata functions to retrieve or generate avatar metadata. Once retrieved, metadata may be passed as an argument to other functions for actual rendering of the avatar. The metadata format may be opaque to video game applications.

Before calling the XAvatarGetMetadataByXuid function, video game applications may call XAvatarGetMetadataByXuidResultSize with the appropriate count parameter to retrieve the size of the metadata result buffer that may be needed to hold the requested number of metadata blobs. The applications may then allocate a buffer to hold the metadata that will be returned by the function, passing a pointer to that buffer as an argument to the metadata function.

The metadata describing a gamer's avatar may be retrieved by calling the XAvatarGetMetadataByXuid function with the gamer's XUID. This function can retrieve more than one avatar per call, if multiple XUIDs are passed in an array. Note that the result buffer may be the proper size as reported by XAvatarGetMetadataByXuidResultSize for the number of XUIDs in the array—the buffer size is not necessarily the product of the XUID count and the size of the XAVATAR_METADATA structure.

Some video game applications may want access to random avatars for purposes such as crowds. This can be accomplished using the XAvatarGetMetadataRandom function to retrieve one or more randomly-created avatars. When calling this function, pointer may be passed which may be set to point to an array of XAVATAR_METADATA structures.

Video game applications may also wish to display the avatars of a gamer's family members if those members are not signed in at the time. This can be done by retrieving avatars from profiles on the local console that are not currently signed in. First, the video game application may determine how many profiles are available on the console but not signed in, using the XAvatarGetMetadataSignedOutProfileCount function. This function may provide the count of available profiles. The video game application may then call XAvatarGetMetadataSignedOutProfile function with an index in the valid range from 0 to count-1. For each call, a pointer may be passed to a XAVATAR_METADATA structure to be filled in with that profile's avatar metadata.

Some video game applications may want to create specific avatars to be used when the game is executing. For example, a quiz game might want to have a host character played by an avatar. Once created, such an avatar's metadata may be passed directly to XAvatarGetAssets or XAvatarCreateRenderer. To get the metadata initially, Avatar Creator may be used to create the avatar. When an avatar is saved to an associated Developer Kit, metadata for that avatar may be written to two files: devkit:\avatar_metadata.h and devkit:\avatar_metadata.bin. If those files already exist, they may be overwritten. Avatar_metadata.bin may contain a simple binary definition of the avatar metadata (i.e., contains the information that tells the avatar system what that avatar looks like and is wearing). This definition may be included in the video game application's source code.

In further embodiments, XAvatar library may include a renderer that can render an avatar into a given Direct3D device. This renderer may be configured and invoked through the IXAvatarRenderer class. A video game application may create an IXAvatarRenderer instance for each avatar by calling the XAvatarCreateRenderer function. This function may allocate approximately 850 kilobytes of memory for the avatar model and assets, plus up to another four megabytes of memory for an optional avatar shadow map (If used, shadow maps can be small (512×512) or large (1024×1024). The shadow map choice may be a parameter to XAvatarCreateRenderer). AddRef and Release may be used to manage the lifetime of the renderer. XAvatarCreateRenderer may return immediately, but the renderer may load avatar assets asynchronously, possibly through multiple requests to an online service. If a video game application uses the renderer before all assets have been received, the renderer may draw a simple, "waiting" graphic in place of the avatar. Video game applications can use GetStatus to determine whether the avatar has been completely loaded.

In the main game loop, video game applications may first call Update to update the avatar's position according to the currently active animation.

Next, if the video game application is using avatar self-shadowing, a shadow map may be generated for the current animation position, using RenderShadow. Once the avatar's position and shadow map have been updated, the Render function may be called to draw the avatar to the given Direct3D device (the video game application may have set a render target and depth buffer ahead of time). As the game loop iterates, repeated calls to Update may animate the model, and RenderShadow and Render may cause the rendered image to reflect the avatar's changing pose.

Video game applications may set their own model and view matrices for rendering an avatar, but the avatar system may supply three standard views: head, head-and-shoulders, and full-body. Video game applications may retrieve these standard matrices using the GetMatrices function. To track animating avatars, video game applications may call this function after a call to Update and pass the results to both RenderShadow and Render.

When a video game application is using the IXAvatarRenderer class to render an avatar, the avatar may play a randomized sequence of idle animations.

In an embodiment, video game applications that use the IXAvatarRenderer class to render an avatar may use the IXavatarAnimation class to specify animations for the avatar to perform.

An animation may be encapsulated in an IXAvatarAnimation object. Video game applications may use the XAvatar- LoadAnimation function to load one of a preset list of animations defined by the XAvatar library. Loading an animation with this function may allocate approximately 200 kilobytes of memory to hold the animation data.

Video game applications may also provide their own animations by loading an animation from a memory buffer with the XAvatarLoadAnimationFromBuffer function.

AddRef and Release may be used to manage the lifetime of an animation.

Like the renderer object, animations may take time to load. Video game applications may use the GetStatus function to ensure that an animation has completed loading before attempting to use the animation. Animations may not available for playback until they have finished loading.

Video game applications may call the PlayAnimations function to queue a list of animations for playback. Animations may play in the order they appear in the list. By default, a subsequent call to PlayAnimations may clear the existing queue, insert the new list of animations, and immediately begin playing the first animation in the new queue. It may be possible to modify this behavior by calling PlayAnimations with appropriate flags.

When playback transitions from one animation to another, the two animations may be blended together so that there is no sudden, jarring change in the avatar's position.

Video game applications may use GetCurrentAnimation to determine which animation is currently running.

In some embodiments, video game applications may choose to render and animate avatars using their own rendering engine. In this case, video game applications may load avatar geometry and graphical assets explicitly, and then render them explicitly in its own way.

To determine the buffer size required to hold an avatar's assets, video game applications may first call XAvatarGetAssetsResultSize, and allocate two buffers of the indicated sizes. The first buffer (pResultBuffer) may hold avatar geometry metadata and pointers to the GPU resources (vertex arrays, textures, etc.) stored in the second buffer (pGpuResourceBuffer.) The buffer pointed to by pGpuResourceBuffer may start on a 4096-word boundary so that textures are properly aligned in memory.

The pResultsBuffer and pGpuResourceBuffer buffers may then be passed to XAvatarGetAssets, which may fill them with the requested assets. An exemplary format is listed in the Appendix.

Asset retrieval may involve multiple queries to an online service to retrieve all of the assets. Video game applications must follow standard X asynchronous programming practices for this operation. An active XAvatarGetAssets request may be canceled by calling XCancelOverlapped.

When the XAvatar library functionality is no longer being used, video game applications may call the XAvatarShutdown function to release memory and resources being taken up by the library.

A video game application may initialize the library, use it for a period of time, shut down the library, and then later re-initialize the library for additional use. One such scenario might be a video game application that uses avatars in the game lobby, but not during gameplay. Such a video game application may initialize the XAvatar library when going into the game lobby, use the library in the lobby, and then call XAvatarShutdown when transitioning to gameplay, freeing memory and resources for the game. When the game ends and players return to the lobby, the video game application may call XAvatarInitialize again to start using the XAvatar library again.

Figure 13:
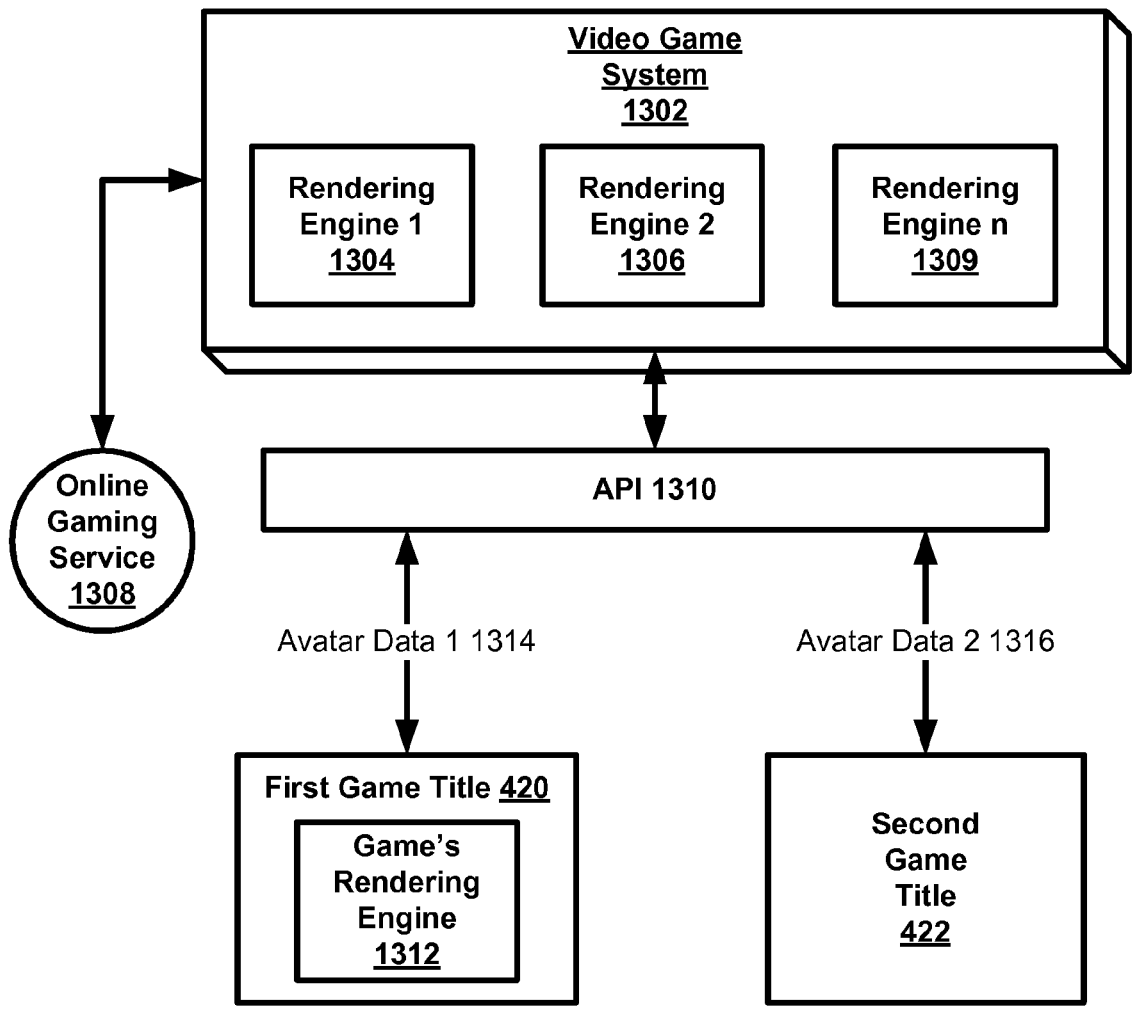
FIG. 13 illustrates an exemplary system that provides an API for accessing avatar information.

Referring now to FIG. 13, illustrated is an exemplary video game system 1302 including one or more avatar rendering engines 1304, 1306 and 1309. Game titles 420 and 422 (also referred to as video game applications) may execute on the video game system 1302. The first video game title 420 may include an avatar rendering engine 1312. The title 420 may request and receive avatar data from the video game system 1302 via the API 1310. The received data 1314 may be used by the game's rendering engine 1312 to render one or more avatars using the game title's own rendering code in the rendering engine 1312. A second game title 422 may or may not include its own avatar rendering engine. In either case, the game title 422 may opt to use the video game system's avatar rendering services using one or more rendering engines 1304, 1306 or 1309. Game title 422 may initiate the process using the API 1310 including one or more avatar target locations in the data 1316. The video game system 1302 may then render the requested avatars at the target locations. Whether the system renders the avatars or the game title renders the avatars, in some cases the avatars may be retrieved from an online gaming service 1308.

Figure 14:
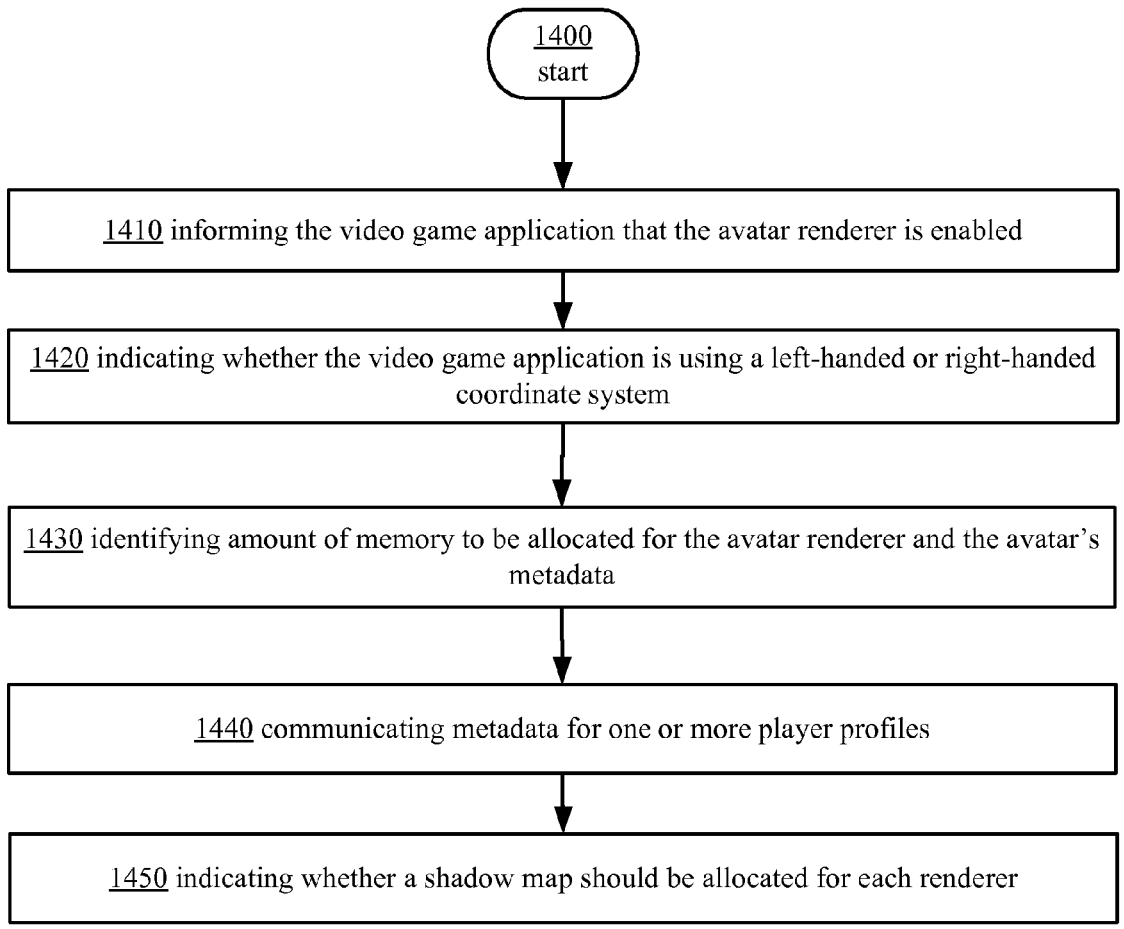
FIG. 14 illustrates an example of an operational procedure for implementing an application programming interface (API) for allowing a video gaming system including an avatar renderer to render an avatar to a destination provided by a video game application executing on the video gaming system.
Figure 15:
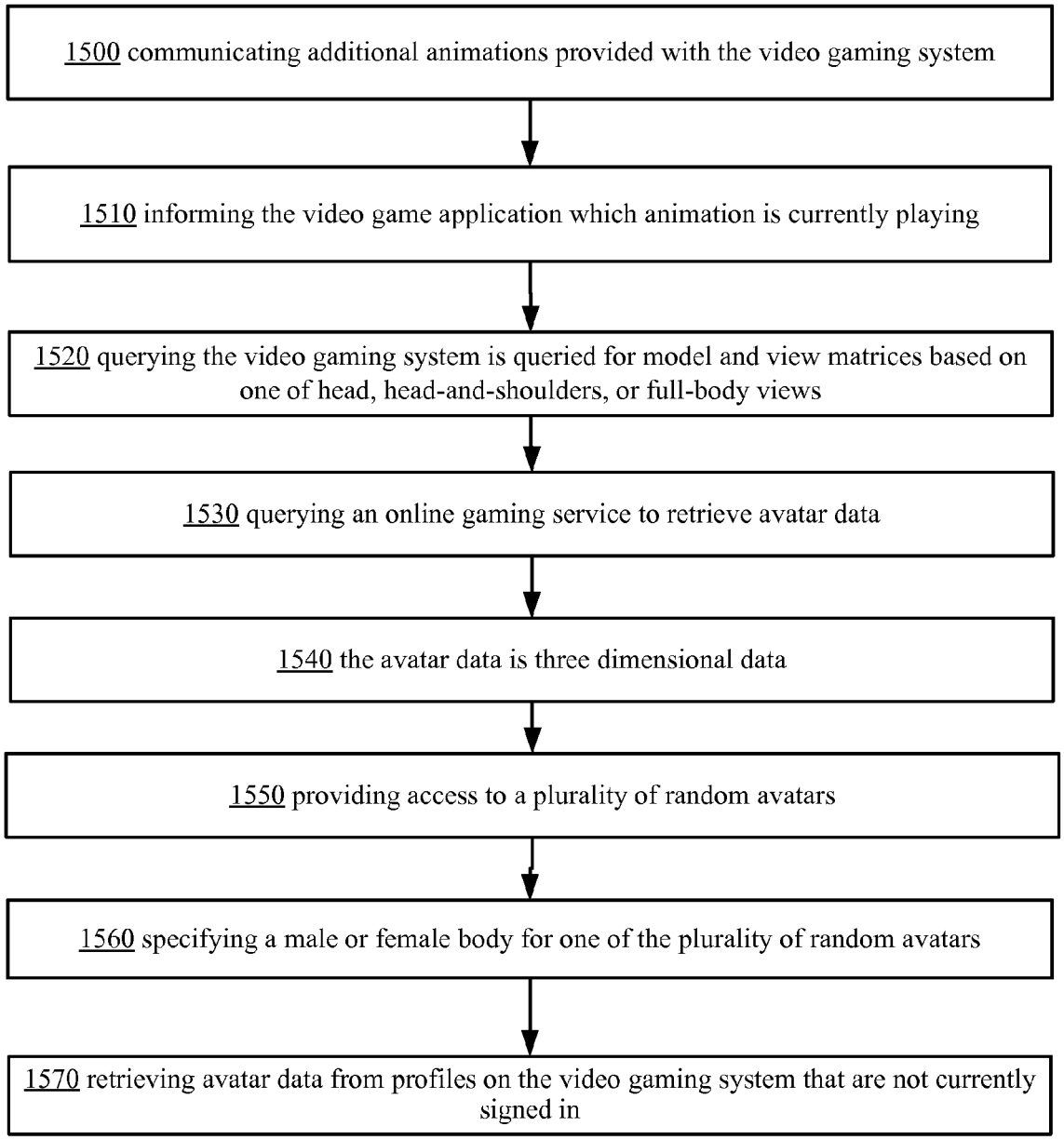
FIG. 15 illustrates an example of an operational procedure for implementing an application programming interface (API) for allowing a video gaming system including an avatar renderer to render an avatar to a destination provided by a video game application executing on the video gaming system.

FIGS. 14 and 15 depict an example of an operational procedure for implementing an application programming interface (API) for allowing a video gaming system including an avatar renderer to render an avatar to a destination provided by a video game application executing on the video gaming system. The procedure may include operations 1400, 1410, 1420, 1430, 1435, 1440, and 1450. Referring to FIG. 14, operation 1400 begins the operational procedure and operation 1410 illustrates informing the video game application that the avatar renderer is enabled. Operation 1420 illustrates receiving an indication as to whether the video game application is using a left-handed or right-handed coordinate system. An amount of memory to be allocated for the avatar renderer and the avatar's metadata is identified in operation 1430. Operation 1440 illustrates communicating metadata for one or more player profiles, and operation 1450 illustrates indicating whether a shadow map should be allocated for each renderer.

Continuing with FIG. 15, operation 1500 illustrates communicating additional animations provided with the video gaming system. Operation 1510 illustrates informing the video game application which animation is currently playing. In operation 1520 the video gaming system is queried for model and view matrices based on one of head, head-and-shoulders, or full-body views. Operation 1530 illustrates querying an online gaming service to retrieve avatar data.

Operation 1540 illustrates that the avatar data is three dimensional data. Operation 1550 illustrates providing access to a plurality of random avatars, and operation 1560 illustrates specifying a male or female body for one of the plurality of random avatars. In operation 1570 avatar data is retrieved from profiles on the video gaming system that are not currently signed in.

Figure 16:
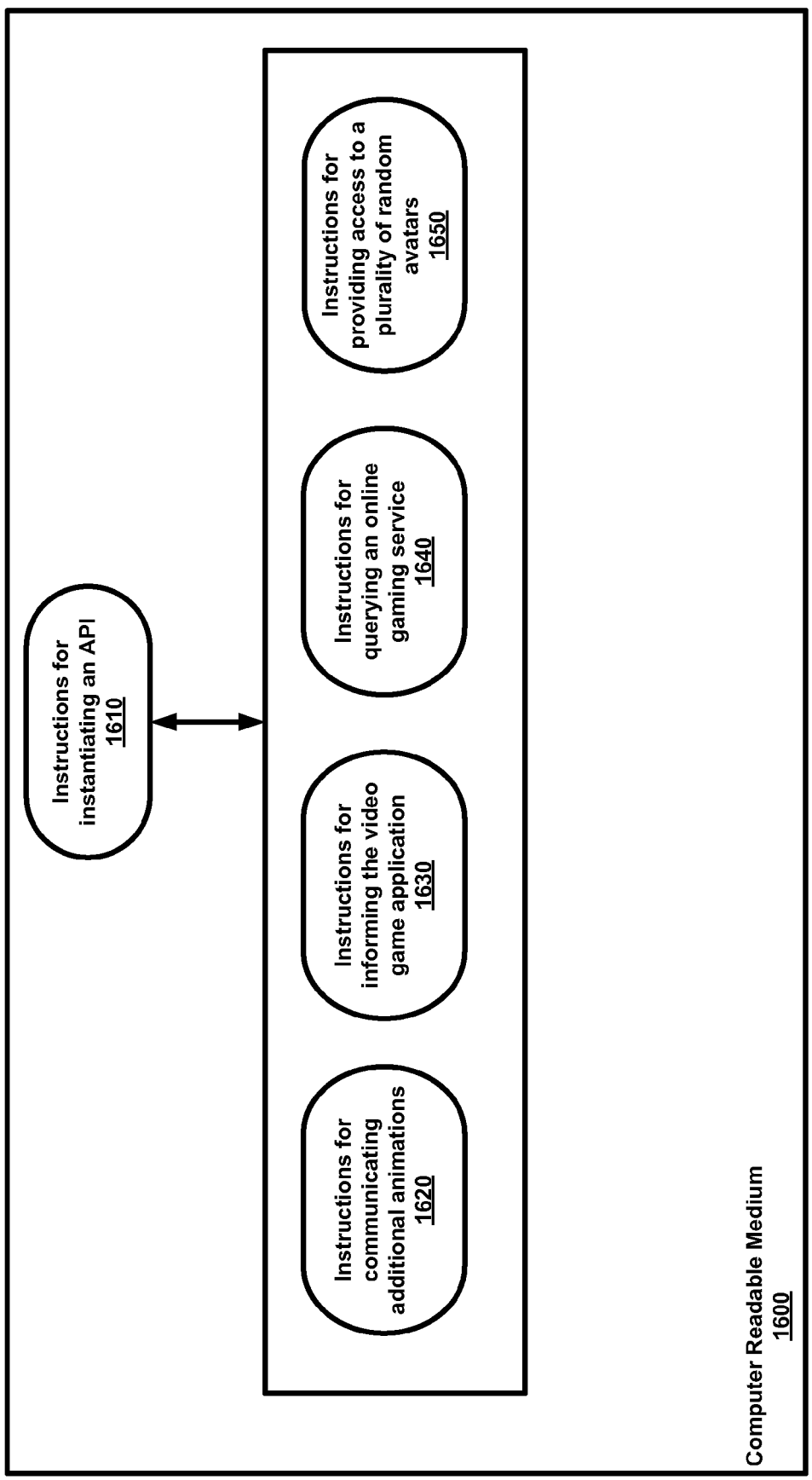
FIG. 16 illustrates a computer readable medium bearing computer executable instructions for instantiating an API for allowing a video game application executing in a video game system to render one or more avatars at a rendering destination selected by the video game application.

Any of the above mentioned aspects can be implemented in methods, systems, computer readable media, or any type of manufacture. For example, per FIG. 16, a computer readable medium can store thereon computer executable instructions for instantiating an API for allowing a video game application executing in a video game system to render one or more avatars at a rendering destination selected by the video game application. Such media can comprise a first subset of instructions for exposing an interface for allowing the video game application to access data for rendering the avatar to a render target or texture selected by the video game application 1610. It will be appreciated by those skilled in the art that additional sets of instructions can be used to capture the various other aspects disclosed herein, and that the three presently disclosed subsets of instructions can vary in detail per the present disclosure.

For example, the instructions can further comprise instructions 1620 for communicating additional animations provided by the video gaming system. The instructions can further comprise instructions for informing the video game application which animation is currently playing 1630, and instructions for querying the video gaming system for model and view matrices based on one of head, head-and-shoulders, or full-body views.

For example, the instructions can further comprise instructions 1640 for querying an online gaming service to retrieve avatar data. The instructions can further comprise instructions for providing access to a plurality of random avatars 1650, and retrieving avatar data from profiles on the video gaming system that are not currently signed in.

Figure 17:
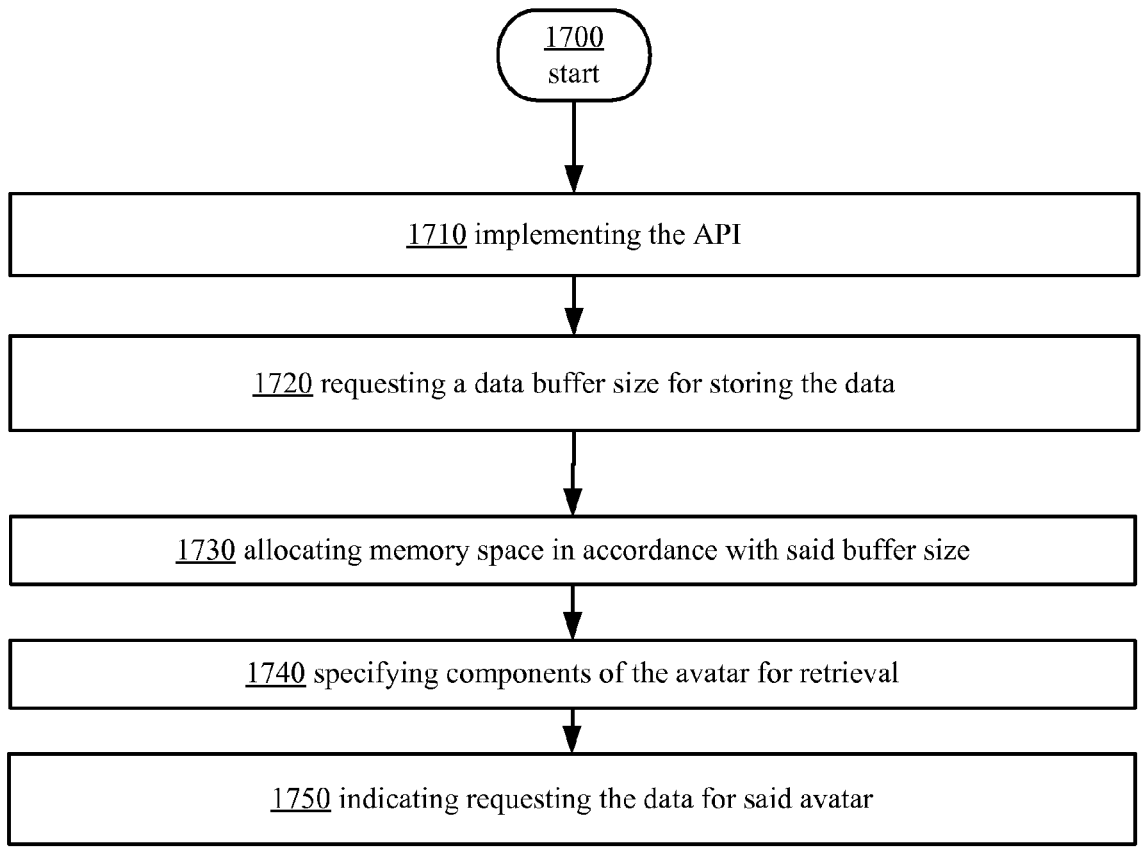
FIG. 17 illustrates an example of an operational procedure for allowing a video game application including an avatar rendering function executing in a video game system to receive data for constructing, rendering and animating an avatar.
Figure 18:
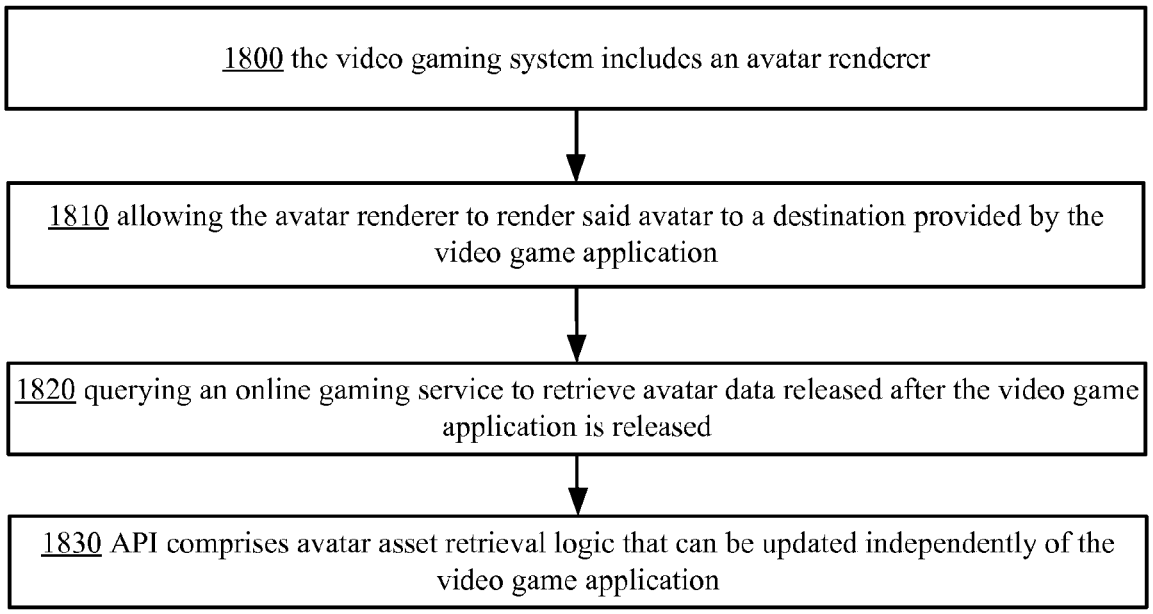
FIG. 18 illustrates an example of an operational procedure for allowing a video game application including an avatar rendering function executing in a video game system to receive data for constructing, rendering and animating an avatar.

FIGS. 17 and 18 depict an example of an operational procedure for allowing a video game application including an avatar rendering function executing in a video game system to receive data for constructing, rendering and animating an avatar. The procedure may include operations 1700, 1710, 1720, 1730, 1740, and 1750. Referring to FIG. 17, operation 1700 begins the operational procedure and in operation 1710 implementing the API, the API configured to expose an interface for allowing the video game application to access data for representing said avatar and incorporate the data into said rendering function. Operation 1720 illustrates requesting a data buffer size for storing the data. Operation 1730 illustrates allocating memory space in accordance with said buffer size. Operation 1740 illustrates specifying components of the avatar for retrieval, wherein an entire body of said avatar may be requested, and operation 1750 illustrates indicating requesting the data for said avatar.

Continuing with FIG. 18, operation 1800 illustrates that the video gaming system includes an avatar renderer. Operation 1810 illustrates allowing the avatar renderer to render said avatar to a destination provided by the video game application. Operation 1818 illustrates querying an online gaming service to retrieve avatar data released after the video game application is released, and in operation 1830 the API comprises avatar asset retrieval logic that can be updated independently of the video game application.

Exemplary Gaming and Computing Environments

Figure 11:
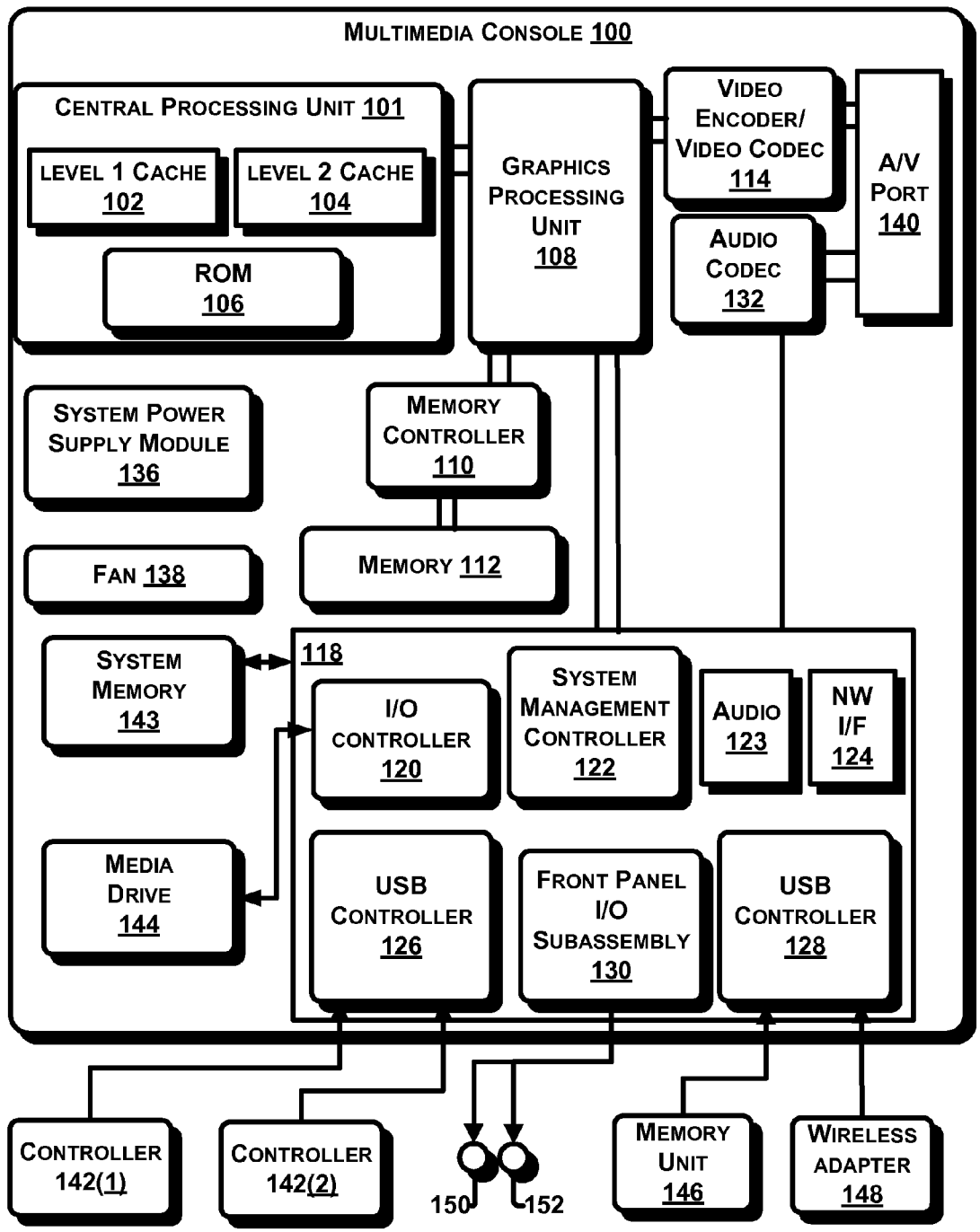
FIG. 11 illustrates an exemplary computing device, such as a console, that can be used in conjunction with the various aspects of the present disclosure discussed with reference to FIGS. 1-12.

The above discussed computing devices and accessories can be embodied as gaming consoles, music players, personal computers, controllers, remote control devices and other such devices having different, similar, or the same platforms. Referring to FIG. 11, a block diagram shows an exemplary multimedia console that can be used in conjunction with the various accessories with lighting activation by proximity and motion capabilities.

This console, which includes a game oriented console or a PC, can comprise, for example, digital audio processing functionality. Specifically, in FIG. 11, a multimedia console 100 is shown, with a central processing unit (CPU) 101 having a level 1 (L1) cache 102, a level 2 (L2) cache 104, and a flash ROM (Read-only Memory) 106. The level 1 cache 102 and level 2 cache 104 can temporarily store data and hence reduce the number of memory access cycles, thereby improving processing speed and throughput. The flash ROM 106 can store executable code that is loaded during an initial phase of a boot process when the multimedia console 100 is powered. Alternatively, the executable code that is loaded during the initial boot phase can be stored in a flash memory device (not shown). Further, ROM 106 can be located separately from the CPU 101. These memory devices can cache parts or the entirety of the above mentioned applications, programs, applets, managed code, and so on. Moreover, these memory devices can store sensitive and non-sensitive information on a memory unit-by-memory unit basis, as was discussed above. Any of such information can be used at least in part to aid in animating avatars as was discussed above.

A graphics processing unit (GPU) 108 and a video encoder/video codec (coder/decoder) 114 can form a video processing pipeline for high speed and high resolution graphics processing. Data can be carried from the graphics processing unit 108 to the video encoder/video codec 114 via a bus. The video processing pipeline can output data to an A/V (audio/video) port 140 for transmission to a television or other display. A memory controller 110 can be connected to the GPU 108 and CPU 101 to facilitate processor access to various types of memory 112, such as, but not limited to, a RAM (Random Access Memory). Thus, various types of information, whether sensitive or not, or even parts of various types of information, can be stored in the various types of memories discussed above, depending on the need.

The multimedia console 100 can include an I/O controller 120, a system management controller 122, an audio processing unit 123, a network interface controller 124, a first USB host controller 126, a second USB controller 128 and a front panel I/O subassembly 130 that can be preferably implemented on a module 118. The USB controllers 126 and 128 can serve as hosts for peripheral controllers 142(1)-142(2), a wireless adapter 148, and an external memory unit 146 (e.g., flash memory, external CD/DVD ROM drive, removable media, etc.). Such peripheral controllers 142(1)-142(2) can have various types of lighting displays that is triggered by proximity and motion. Moreover, the network interface 124 and/or wireless adapter 148 can provide access to a network (e.g., the Internet, home network, etc.) and can be any of a wide variety of various wired or wireless interface components including an Ethernet card, a modem, a Bluetooth module, a cable modem, and the like.

System memory 143 can be provided to store application data that is loaded during the boot process. A media drive 144 can be provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 can be connected to the I/O controller 120 via a bus, such as a Serial ATA bus or other high speed connection (e.g., IEEE 1394). Additional to such application data, other information can be stored on the console 100 that will aid in the communication between peripheral/accessory device controllers and the console 100 itself.

The system management controller 122 can provide a variety of service functions to assure the availability of the multimedia console 100. The audio processing unit 123 and an audio codec 132 can form a corresponding audio processing pipeline with high fidelity, three dimensional, surround, and stereo audio processing according to aspects of the presently disclosed subject matter above. Audio data can be carried between the audio processing unit 123 and the audio codec 126 via a communication link. The audio processing pipeline can output data to the A/V port 140 for reproduction by an external audio player or device having audio capabilities.

The front panel I/O subassembly 130 can support the functionality of the power button 150 and the eject button 152, as well as any LEDs (light emitting diodes) or other indicators exposed on the outer surface of the multimedia console 100. A system power supply module 136 can provide power to the components of the multimedia console 100. A fan 138 can cool the circuitry within the multimedia console 100.

The CPU 101, GPU 108, memory controller 110, and various other components within the multimedia console 100 can be interconnected via one or more buses, including serial and parallel buses, a memory bus, a peripheral bus, and a processor or local bus using any of a variety of bus architectures.

When the multimedia console 100 is powered on or rebooted, application data can be loaded from the system memory 143 into memory 112 and/or caches 102, 104 and executed on the CPU 101. Such application data can include some of the online derived data, including the avatar packages discussed above. The application can also present a graphical user interface that provides a consistent user experience when navigating to different media types available on the multimedia console 100. Users can accessorize avatars using such a user interface. In operation, applications and/or other media contained within the media drive 144 can be launched or played from the media drive 144 to provide additional functionalities to the multimedia console 100. And, such media, including game video game applications can be the basis for accessorizing avatars.

The multimedia console 100 can be operated as a standalone system by simply connecting the system to a television or other display. In this standalone mode, the multimedia console 100 can allow one or more users to interact with the system, watch movies, listen to music, and the like. However, with the integration of broadband connectivity made available through the network interface 124 or the wireless adapter 148, the multimedia console 100 can further be operated as a participant in a larger network community of computing devices. As such a participant, it can interact with computing devices, whether PCs or servers, and receive information that can be eventually stored.

Figure 12:
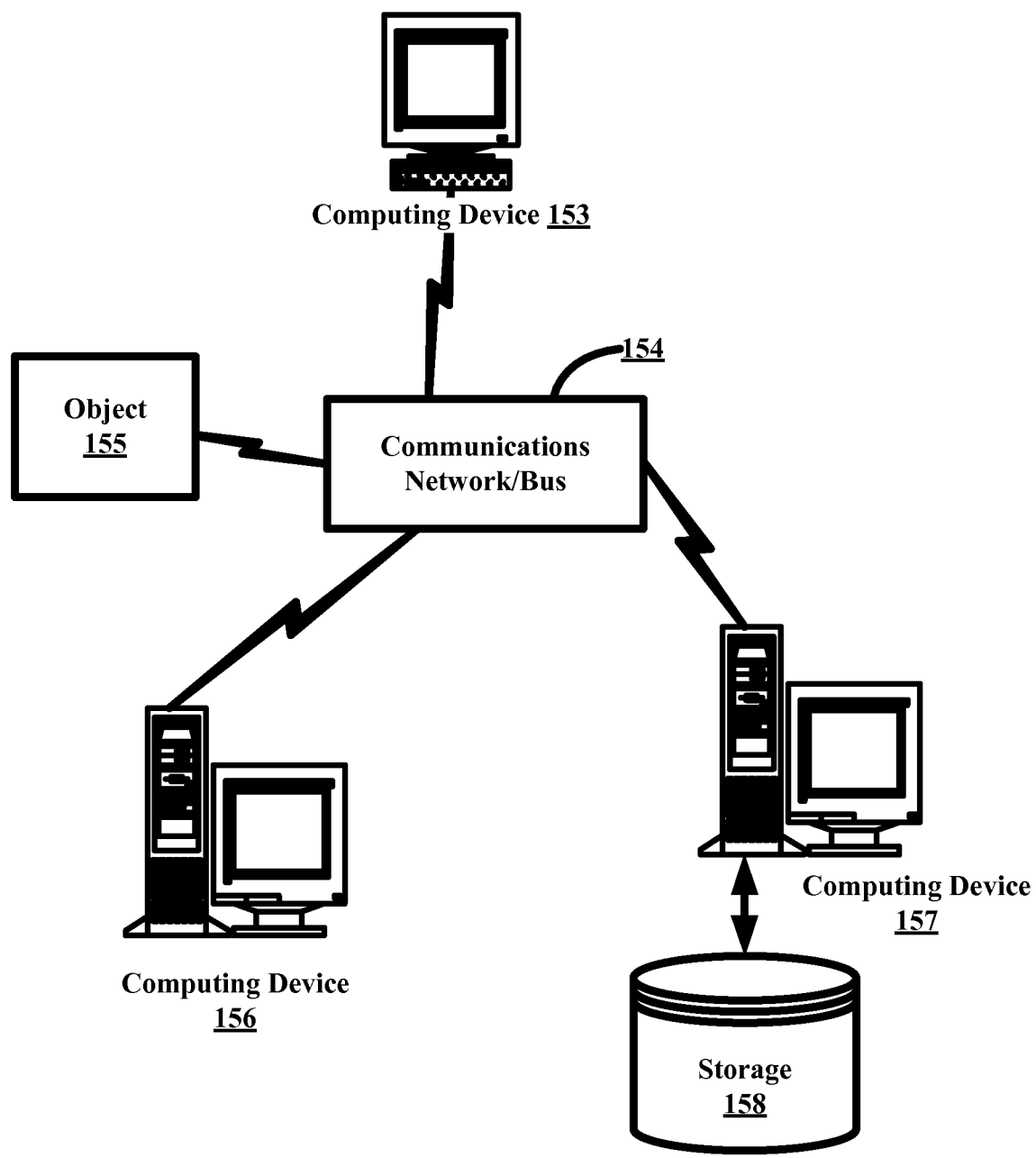
FIG. 12 illustrates an exemplary networking environment for the presently disclosed subject matter discussed with reference to FIGS. 1-12.

Next, FIG. 12 illustrates an exemplary networking environment for subject matter discussed with reference to FIGS. 1-11 and 13-18. The above discussed console 100 can correspond to any one of the aforementioned computing devices, or it can be distributed over such devices. It can interact with various other objects 155 and storage devices 158 via a communications network/bus 154, where such objects 155 and devices 158 can correspond to other computing devices (whether hardware, firmware, or software). The controllers 142(1)-142(2) can communicate with the console 100 in a wired manner or wirelessly, over close distances or over remote distances using the shown communications network 154. Such communication can be aided by various computing devices 156, 153, 157 connected to the communications network 154.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

Finally, it should also be noted that the various techniques described herein can be implemented in connection with hardware or software or, where appropriate, with a combination of both. Thus, the methods and apparatus of the presently disclosed subject matter, or certain aspects or portions thereof, can take the form of program code (i.e., instructions) embodied in tangible storage media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device can generally include a processor, a storage medium readable by the processor (including volatile and non-volatile memory and/or storage elements), at least one input device, and at least one output device. One or more programs that can utilize the creation and/or implementation of domain-specific programming models aspects of the present invention, e.g., through the use of a data processing application programming interface (API) or the like, are preferably implemented in a high level procedural or object oriented programming language to communicate with a computer system. However, the program(s) can be implemented in assembly or machine language, if desired. In any case, the language can be a compiled or interpreted language, and combined.

Finally, while the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods, systems, and computer readable media were described configured for providing animation accessorization of avatars. However, other equivalent mechanisms to these described aspects are also contemplated by the teachings herein. Therefore, the present disclosure should not be limited to any single aspect, but rather construed in breadth and scope in accordance with the appended claims.

APPENDIX

API Reference

Initialization and Shutdown Functions
XAvatarInitialize
Video game applications may initialize the avatar system before calling any other avatar functions.

```
XAPI
HRESULT
WINAPI
XAvatarInitialize(
    IN   XAVATAR_COORDINATE_SYSTEM
eCoordinateSystem,
    IN   DWORD                              dwFlags,
    IN   DWORD
dwJointsBufferCount,
    IN   LPDIRECT3DDEVICE9                  device
    );
```

Parameters:
  eCoordinateSystem indicates whether the video game application is using a left-handed or right-handed coordinate system.
  dwFlags is currently used to specify whether the renderer is enabled, with XAVATAR_INITIALIZE_FLAGS_ENABLERENDERER.

dwJointsBufferCount is ignored when the renderer is not enabled, but otherwise must be between 2 and 4 inclusively, and specifies how many joint buffers should be allocated per avatar renderer. This is because when an avatar renderer is updated to the latest frame of animation, the built joint matrices are copied into a vertex buffer that can be accessed by the vertex shader during rendering. To prevent contention on this locked buffer, multiple buffers should be used. A debug message is displayed when such contention occurs, indicating that this value should be increased.

device is also ignored when the renderer is not enabled. If the renderer is enabled, the device supplied will be used internally to prepare the avatar rendering pipeline (creating shaders, etc.)

Return Values:
Returns S_OK if successful, an error code otherwise.

Remarks:
Initialization allocates memory for the avatar system based on the input parameters.

XAvatarInitialize always allocates approximately 2 megabytes to cache avatar assets. If the dwFlags parameter has the AVATAR_INITIALIZE_FLAGS_ENABLERENDERER bit set, approximately 500 kilobytes are allocated to store shared idle animations. Allocations are made from the regular heap.

XAvatarShutdown
Shuts down the avatar system and frees memory and resources used by the system.

```
XAPI
VOID
WINAPI
XAvatarShutdown(
    VOID
    );
```

Remarks:
Video game applications can initialize and shut down the avatar system repeatedly while running, provided that each call to XAvatarInitialize is paired with a matching call to XAvatarShutdown before XAvatarInitialize is called again. Video game applications might do this if using avatars in the game lobby, but not during gameplay. The avatar system could be initialized when entering the lobby, and shut down when leaving the lobby.

Memory and system resources claimed by calls to XAvatarInitialize will not be released until XAvatarShutdown has been called.

Metadata Functions
Before retrieving an avatar's assets for display, the avatar's metadata must be retrieved. This metadata is stored in the user's profile and is a binary blob that contains internal information about the avatar's composition. The metadata format is opaque to the video game application.

XAvatarGetMetadataByXuid
The video game application may retrieve metadata for one or more X profiles:

```
XAPI
HRESULT
WINAPI
XAvatarGetMetadataByXuid(
    IN      DWORD           dwUserIndexRequester,
    IN      DWORD           dwXuidCount,
    IN      const XUID*     pXuids,
    OUT     HRESULT*        pResults,
    OUT     XAVATAR_METADATA*  pAvatarMetadata,
    IN OUT  PXOVERLAPPED    pOverlapped
    );
```

Parameters:
dwUserIndexRequester is the local user index of the player requesting the metadata.

dwXuidCount is the number of XUIDs in the pXuids array.

pXuids is an array of the XUIDs whose metadata is to be retrieved.

pResults point to the buffer where result codes are returned indicating success or failure in retrieving avatar metadata for specific XUIDs. Treat this buffer as an array of dwXuidCount HRESULTs, where the value of pResults[n] is the result of retrieving metadata for pXuids[n].

pResultBuffer is the buffer where results will be returned. On successful completion, this buffer can be treated as an array of XAVATAR_METADATA. If pResults[n] indicates failure, then the XAVATAR_METADATA in pAvatarMetadata[n] will be invalid.

pOverlapped is a pointer to an XOVERLAPPED structure used to monitor the status of the retrieval operation. If pOverlapped is NULL, the operation is completed synchronously.

Returns:
Returns ERROR_SUCCESS if the function succeeds and returns immediately, ERROR_IO_PENDING to indicate that the asynchronous overlapped operation is pending, or ERROR_FUNCTION_FAILED.

If ERROR_FUNCTION_FAILED is returned, XGetOverlappedExtendedError may be called to retrieve extended error information.

XAvatarGetMetadataLocalUser
Retrieves metadata for local users.

```
XAPI
HRESULT
WINAPI
XAvatarGetMetadataLocalUser(
    IN      DWORD           dwUserIndex,
    OUT     XAVATAR_METADATA*  pAvatarMetadata,
    IN OUT  XOVERLAPPED*    pOverlapped
    );
```

Parameters:
dwUserIndex is the local user index of the player whose avatar metadata is being requested.

pAvatarMetadata: On successful completion, this pointer points to the avatar metadata for the indicated player.

pOverlapped is a pointer to an XOVERLAPPED structure used to monitor the status of the retrieval operation. If pOverlapped is NULL, the operation is completed synchronously.

Returns:
Returns ERROR_SUCCESS if the function succeeds and returns immediately, ERROR_IO_PENDING to indicate that the asynchronous overlapped operation is pending, or ERROR_FUNCTION_FAILED.

If ERROR_FUNCTION_FAILED is returned, XGetOverlappedExtendedError may be called to retrieve extended error information.

XAvatarGetMetadataRandom

Some video game applications will want access to a range of random avatars for things like crowds. This function returns metadata for one or more randomly generated avatars.

```
XAPI
HRESULT
WINAPI
XAvatarGetMetadataRandom(
    IN      XAVATAR_BODY_TYPE_MASK  BodyTypeMask,
    IN      DWORD                   dwAvatarCount,
    OUT     XAVATAR_METADATA*       pAvatarMetadata,
    IN OUT  PXOVERLAPPED            pOverlapped
);
```

Parameters:
  BodyTypeMask is a bit mask that specifies which body type (male or female) the random avatar should use.
  dwAvatarCount specifies the number of random avatars to be created.
  pAvatarMetadata: On successful completion, this buffer can be treated as an array of XAVATAR_METADATA, with dwAvatarCount elements.
  pOverlapped is a pointer to an XOVERLAPPED structure used to monitor the status of the retrieval operation. If pOverlapped is NULL, the operation is completed synchronously.
Returns:
  Returns ERROR_SUCCESS if the function succeeds and returns immediately, ERROR_IO_PENDING to indicate that the asynchronous overlapped operation is pending, or ERROR_FUNCTION_FAILED.
  If ERROR_FUNCTION_FAILED is returned, XGetOverlappedExtendedError may be called to retrieve extended error information.

XavatarGetMetadataSignedOutProfileCount

Returns the count of profiles on the console but not currently signed in.

```
XAPI
DWORD
WINAPI
XAvatarGetMetadataSignedOutProfileCount( );
```

Returns:
  Returns the number of profiles on the console that are not currently signed in.
Remarks:
  Use the returned number as an index to enumerate signed-out profiles with XAvatarGetMetadataSignedOutProfile.

XavatarGetMetadataSignedoutProfile

Retrieves avatar metadata for a signed out profile.

```
XAPI
HRESULT
WINAPI
XAvatarGetMetadataSignedOutProfile(
    IN      DWORD                   dwProfileIndex,
    OUT     XAVATAR_METADATA*       pAvatarMetadata,
    IN OUT  PXOVERLAPPED            pOverlapped
);
```

Parameters:
  dwProfileIndex is the index of the requested profile. This value should range from zero to one less than the count returned by XavatarGetMetadataSignedOutProfileCount.
  pAvatarMetadata is the buffer that will hold the requested metadata.
  pOverlapped is a pointer to an XOVERLAPPED structure used to monitor the status of the retrieval operation. If pXOverlapped is NULL, the operation is completed synchronously.
Returns:
  Returns ERROR_SUCCESS if the function succeeds and returns immediately, ERROR_IO_PENDING to indicate that the asynchronous overlapped operation is pending, or ERROR_FUNCTION_FAILED.
  If ERROR_FUNCTION_FAILED is returned, XGetOverlappedExtendedError may be called to retrieve extended error information.
Remarks:
  Video game applications would use this function to get avatar metadata for a user's friends and family, to put "known" avatars into the game.

XAvatarMetadataGetBodyType

Returns the body type—male or female—from an avatar's metadata:

```
XAPI
XAVATAR_BODY_TYPE
WINAPI
XAvatarMetadataGetBodyType(
    IN CONST XAVATAR_METADATA*      pMetadata
);
```

Parameters:
  pMetadata is a pointer to a valid XAVATAR_METADATA blob.
Returns:
  An XAVATAR_BODY_TYPE with the appropriate bit set to indicate body type.
Remarks:
  Metadata blobs are opaque to video game applications, and their format is subject to change. Use this function rather than attempting to extract this information from the metadata directly.

Avatar Asset Data Functions

If a video game application wishes to render and animate avatars using its own system, it must first retrieve the underlying data that defines those avatars.

XAvatarGetAssetsResultSize

Returns the size of the data buffers that will hold avatar asset data.

```
XAMINLINE
HRESULT
WINAPI
XAvatarGetAssetsResultSize(
    IN      XAVATAR_COMPONENT_MASK  ComponentMask,
    OUT     DWORD*
```

```
        pcbResultBuffer,
            OUT         DWORD*
        pcbGpuResourceBuffer
        );
```

Parameters:
  ComponentMask is a bitfield used to specify which assets are required. Combine XAVATAR_COMPONENT_MASK values to specify the required assets. Video game applications that want to retrieve the entire body should use XAVATAR_COMPONENT_MASK_ALL.
  pcbResultBuffer: Points to a DWORD that, on successful completion, contains the necessary size, in bytes, of the asset data buffer required to hold the requested assets.
  pcbGpuResourceBuffer: Points to a DWORD that, on successful completion, contains the necessary size, in bytes, of the GPU resource buffer required to hold the requested assets.

Returns:
  Returns S_OK on success, or an error code.

Remarks:
The video game application must then allocate two buffers of these sizes to hold the retrieved avatar data. The second of these buffers is most appropriately done as a physical allocation, on a 4096 byte boundary, so that the textures it will contain can be constructed in place.

XAvatarGetAssets
Loads the assets required to render an avatar.

```
XAPI
HRESULT
WINAPI
XAvatarGetAssets(
    IN      CONST XAVATAR_METADATA*     pMetadata,
    IN      XAVATAR_COMPONENT_MASK      ComponentMask,
    IN      DWORD                       cbResultBuffer,
    OUT     XAVATAR_ASSETS*             pResultBuffer,
    IN      DWORD                       cbGpuResourceBuffer,
    OUT     VOID*                       pGpuResourceBuffer,
    IN OUT  PXOVERLAPPED                pOverlapped
);
```

Parameters:
  pMetadata points to the metadata for the avatar whose assets are being retrieved.
  ComponentMask is a bitfield used to specify which assets are required. Combine XAVATAR_COMPONENT_MASK values to specify the required assets. Video game applications that want to retrieve the entire body should use XAVATAR_COMPONENT_MASK_ALL.
  cbResultBuffer is the size in bytes of the buffer pointed to by pResultBuffer.
  pResultBuffer is the buffer that will hold the asset data.
  cbGpuResourceBuffer is the size in bytes of the buffer pointed to by pGpuResourceBuffer.
  pGpuResourceBuffer is the buffer that will hold GPU resources used for the avatar.
  pOverlapped is a pointer to an XOVERLAPPED structure used to monitor the status of the retrieval operation. If pXOverlapped is NULL, the operation is completed synchronously.

Returns:
  Returns ERROR_SUCCESS if the function succeeds and returns immediately, ERROR_IO_PENDING to indicate that the asynchronous overlapped operation is pending, or ERROR_FUNCTION_FAILED.
  If ERROR_FUNCTION_FAILED is returned, XGetOverlappedExtendedError may be called to retrieve extended error information.

Remarks:
This operation can involve queries to X LIVE to retrieve the entire set of three dimensional assets that the avatar is currently wearing or accessorized with. Because of the possibility of X LIVE queries, particularly in future console system updates, the video game application should expect this operation to take several seconds. Upon completion, the avatar data is written into the video game application-provided result buffer.

The current definitions for this format are given in Appendix A.

Various members of the hierarchy of structures inside pResultBuffer will point to buffers stored inside pGpuResourceBuffer, particularly for items such as textures and vertices. Textures are the first items placed in pGpuResourceBuffer due to their large alignment requirements. While not mandatory, it is recommended that the pGpuResourceBuffer buffer be a physical allocation on a 4096 byte boundary so that the textures can be constructed in place.

It will also be possible to cancel an active XAvatarGetAssets request using XCancelOverlapped.

IXAvatarRenderer Functions
XAvatarCreateRenderer
Creates a new IXAvatarRenderer object for the given avatar.

```
XAPI
HRESULT
WINAPI
XAvatarCreateRenderer(
    IN      PXAVATAR_METADATA       pMetadata,
    IN      XAVATAR_COMPONENT_MASK  ComponentMask,
    IN      XAVATAR_SHADOW_SIZE     eAvatarShadowSize,
    OUT     IXAVATARRENDERER**      ppAvatarRenderer
);
```

Parameters:
  pMetadata points to the metadata for the avatar to be rendered by this IXAvatarRenderer object.
  ComponentMask specifies which parts of the avatar are to be rendered.
  eAvatarShadowSize indicates what size shadow map the renderer should use. Specify XAVATAR_SHADOW_SIZE_NONE to disable shadow mapping, XAVATAR_SHADOW_SIZE_SMALL to use a small (512×512 pixel) shadow map, and XAVATAR_SHADOW_SIZE_LARGE to use a large (1024×1024 pixel) shadow map. Note that using a shadow map causes the renderer to allocate additional memory, as described in Remarks.
  ppAvatarRenderer the address of a pointer which, on successful return, points to an
  IXAvatarRenderer object which has had AddRef called once.

Returns:
  Returns S_OK on success, or an error code.

Remarks:
This function allocates the following amount of memory:

| | |
|---|---|
| ~850KB + | (avatar model and assets) |
| (eAvatarShadowSize == XAVATAR_ SHADOW_SIZE_NONE ? ~0MB) + | |
| (eAvatarShadowSize == XAVATAR_ SHADOW_SIZE_SMALL ? ~0.5MB) + | |
| (eAvatarShadowSize == XAVATAR_ SHADOW_SIZE_LARGE ? ~1.0MB) | (self-shadow map) |

Most of the ~850 KB is comprised of physical allocations because these are textures, vertices, and so on.

AddRef and Release are used to manage the lifetime of the renderer.

Note that while this function returns immediately, the renderer takes some amount of time to retrieve all assets before it will render the avatar. Because avatar retrieval can involve making multiple requests to X LIVE, it could be several seconds before the renderer is capable of displaying the avatar. If IXAvatarRenderer::Render is called before the renderer has finished initializing, it will render a generic "waiting" graphic.

IXAvatarRenderer::GetStatus
Returns the current rendering status of the IXAvatarRenderer object.

```
XAPI
HRESULT
WINAPI
IXAvatarRenderer::GetStatus(
    );
```

Returns:
Returns S_OK if the renderer is prepared to render the avatar. Returns E_PENDING if the avatar is still being retrieved. Returns E_FAIL if the renderer has encountered an error.

Because avatar retrieval can involve making multiple requests to X Live, it could be several seconds before an avatar is displayed after creating the renderer.

IXAvatarRenderer::Update
Updates the avatar's geometry to the specified time in the current animation.

```
XAPI
HRESULT
WINAPI
IXAvatarRenderer::Update(
    IN    FLOAT    fElapsedTime
    );
```

Parameters:
fElapsedTime is the number of milliseconds since Update was last called.

Returns:
S_OK on success, or a failure code.

Remarks:
IXAvatarRenderer::Update should be called every time through the video game application's render loop, before the avatar is rendered.

Video game applications can pause, speed up or slow down an animation by passing appropriate values for the fElapsedTime parameter. A value of 0 will pause the video, while values smaller than the actual elapsed time will slow the animation, and values larger than the actual elapsed time will speed the animation.

IXAvatarRenderer::Render Shadow
Generates the shadow map for the current state of the avatar.

```
XAPI
HRESULT
WINAPI
IXAvatarRenderer::RenderShadow(
    IN    LPDIRECT3DDEVICE9    pDevice,
    IN    XMMATRIX             Model,
    IN    XMMATRIX             View,
    IN    XMMATRIX             Projection
    );
```

Parameters:
pDevice is a pointer to the current render target.
Model is the current model transform
View is the current view transform
Projection is the current projection transform Returns:
S_OK on success, or an error code.

Remarks:
IXAvatarRenderer::Render Shadow writes to EDRAM.
IXAvatarRenderer::RenderShadow should be called after IXAvatarRenderer::Update has been called to update the avatar's position, and before IXAvatarRenderer::Render is called to render the avatar.

IXAvatarRenderer::Render
Renders the avatar to the given target.

```
XAPI
HRESULT
WINAPI
IXAvatarRenderer::Render(
    IN    LPDIRECT3DDEVICE9    pDevice,
    IN    XMMATRIX             Model,
    IN    XMMATRIX             View,
    IN    XMMATRIX             Projection
    );
```

Parameters:
pDevice is a pointer to the current render target.
Model is the current model transform
View is the current view transform
Projection is the current projection transform Returns:
S_OK on success, or an error code.

Remarks:
IXAvatarRenderer::Render should be called after IXAvatarRenderer::Update has updated the animation state and IXAvatarRenderer::RenderShadow has rendered the shadow map to match the latest animation state.

The video game application must set a render target and depth buffer for *pDevice before calling this function.

IXAvatarRenderer::GetMatrices
Retrieves the appropriate model and view transform matrices for one of three standard views: head; head-and-shoulders; or full-body.

```
XAPI
HRESULT
WINAPI
IXAvatarRenderer::GetMatrices(
    IN      XAVATAR_RENDER_VIEW  eView,
    OUT     XMMATRIX*                       pModel,
    OUT     XMMATRIX*                       pView
);
```

Parameters:
eView specifies the standard view whose transform matrices are requested
pModel points to an XMMATRIX. On success, the matrix is set to the requested model transform matrix.
pView points to an XMMATRIX. On success, the matrix is set to the requested view transform matrix.

Returns:
S_OK on success, or an error code.

Remarks:
Video game applications should call this function to retrieve new after each call to IXAvatarRenderer::Update, and then pass the new matrices to both IXAvatarRenderer::RenderShadow and IXAvatarRenderer::Render. This will ensure that the avatar is tracked correctly even when animating. This is particularly important for the zoomed-in head-shot.
It's also important that the same matrices are passed to both IXAvatarRenderer::RenderShadow and IXAvatarRenderer::Render so that the shadow map matches the render.

XAvatarRenderWaiting

Renders the "waiting" animation used to indicate that avatar metadata is still being downloaded.

```
XAPI
HRESULT
WINAPI
XAvatarRenderWaiting(
    IN      LPDIRECT3DDEVICE9   device,
    IN      XMMATRIX            modelMatrix,
    IN      XMMATRIX            viewMatrix,
    IN      XMMATRIX            projectionMatrix
);
```

Parameters:
pDevice is a pointer to the current render target.
Model is the current model transform
View is the current view transform
Projection is the current projection transform Returns:
S_OK on success, or an error code.

Remarks:
Video game applications should use this function when they wish to display an avatar but are still waiting for metadata to be returned from the LIVE service.
The three matrices should be the same as those that would be provided to IXAvatarRenderer::Render.

IXAvatarAnimation Functions

XAvatarLoadAnimation

Creates an IXAvatarAnimation object by loading a stock animation from the avatar system.

```
XAPI
HRESULT
WINAPI
XAvatarLoadAnimation(
    IN      const XAVATAR_ASSETID *  AssetId,
    OUT     IXAVATARANIMATION**      ppAvatarAnimation,
);
```

Parameters:
AssetId is one of a defined set of constants representing the stock animations included in the avatar system. A set of animation identifiers is provided in xavatar.h: XAVATAR_ASSETID ANIMATION_CLAP, XAVATAR_ASSETID ANIMATION WAVE, etc.
ppAvatarAnimation is the address of a pointer to the returned IXAvatarAnimation object.

Returns:
S_OK on success, or an error code.

Remarks:
This function allocates the following amount of memory: ~200 KB (animation data)
This operation can involve queries to X LIVE. Because of the possibility of X LIVE queries, the video game application should expect this operation to take several seconds. Video game applications should use the IXAvatarAnimation::GetStatus function to determine when an animation is ready to be used.
AddRef and Release are used to manage the lifetime of an IXAvatarAnimation object.

XAvatarLoadAnimationFromBuffer

Creates an IXAvatarAnimation object from a memory buffer containing an animation description.

```
XAPI
HRESULT
WINAPI
XAvatarLoadAnimationFromBuffer(
    IN      VOID*           pAnimationBuffer,
    IN      DWORD           cbAnimationBuffer,
    OUT     IXAVATARANIMATION**  ppAvatarAnimation,
);
```

Parameters:
pAnimationBuffer points to the animation description.
cbAnimationBuffer specifies the size, in bytes, of the animation buffer.
ppAvatarAnimation is the address of a pointer to the returned IXAvatarAnimation object.

Returns:
S_OK on success, or an error code.

Remarks:
This function allocates the following amount of memory: ~200 KB (animation data)
This operation can involve queries to X LIVE. Because of the possibility of X LIVE queries, the video game application should expect this operation to take several seconds. Video game applications should use the IXAvatarAnimation::GetStatus function to determine when an animation is ready to be used.
AddRef and Release are used to manage the lifetime of an IXAvatarAnimation object.

IXAvatarAnimation::GetStatus

Returns the status of the IXAvatarAnimation object.

```
XAPI
HRESULT
```

```
                WINAPI
       IXAvatarAnimation::GetStatus(
                  );
```

Returns:
   The return value will typically be S_OK if the animation has been loaded, E_FAIL if the animation has failed to load, or E_PENDING if the avatar is still being loaded. The animation is not available for playback until it has been loaded.

IXAvatarRenderer::PlayAnimations
Plays a sequence of animations.

```
XAPI
HRESULT
WINAPI
IXAvatarRenderer::PlayAnimations(
       IN     DWORD                      nAnimationCount,
       IN     LPXAVATARANIMATION*        pAnimations,
       IN     XAVATAR_PLAYANIMATIONS_FLAGS  flags
       );
```

Parameters:
   nAnimationCount Number of IXAvatarAnimation objects in the pAnimations array.
   pAnimations Address of an array of IXAvatarAnimation objects.
   Flags A combination of XAVATAR_PLAYANIMATION-S_FLAGS value specifying play options for the given list of animations.
Returns
   S_OK on success, or an error code.
Remarks:
   Calling this API will clear out any previously-queued animations and will play the supplied sequence of animations.
   The flags parameter controls how the animations should be played:
      By default, the currently playing animation will be interrupted and the first animation in the pAnimations array will be started immediately (blending from the previous animation to prevent jarring movements).
      If XAVATAR_PLAYANIMATIONS_FLAGS_WAIT_FOR_CURRENT_ANIM is specified, then the current animation will be allowed to complete before starting the pAnimations array. Note that the queue of animations still yet to be started will always be cleared, even if this flag is specified. This flag only allows the currently playing animation to complete before starting the pAnimations array.
      If XAVATAR_PLAYANIMATIONS_FLAGS_LOOP_LAST_ANIM is specified, then the last animation in the array will be played in a loop until the next call to PlayAnimations. Without this flag, once the last animation in the array completes, the renderer will return to playing the built-in idle animations.
IXAvatarRenderer::GetCurrentAnimation
Returns a pointer to the IXAvatarAnimation object currently playing on the given IXAvatarRenderer.

```
       XAPI
       HRESULT
```

```
             WINAPI
       IXAvatarRenderer::GetCurrentAnimation(
          OUT      IXAVATARANIMATION**   ppAnimation
          );
```

Parameters:
   ppAnimation On success, ppAnimation points to an IXAvatarAnimation pointer for the current animation.
Returns:
   This returns S_FALSE and sets ppAnimation to NULL if one of the built-in idle animation is currently playing.
Remarks:
   The caller is responsible for calling Release on the returned interface when they are finished with it.

What is claimed:

1. A computer implemented method for implementing an application programming interface (API), the method comprising:
   informing, via the API, a video game application executing on a video gaming system that an avatar renderer of the video gaming system is enabled, the avatar renderer being a functional feature of the video gaming system configured to provide avatar rendering functionality for the video game application during execution of the video game application by the video gaming system and allow the video game application executing in the video game system to access data for rendering an avatar to a render target selected by the video game application, the avatar renderer configured to render the avatar to a destination in a rendered environment of the video game application so that the rendered avatar is displayed within the rendered environment of the video game application;
   receiving an indication from the video game application via the API of whether the video game application is using a left-handed or right-handed coordinate system for processing graphics data;
   informing the video game application via the API of an amount of memory to be allocated for the avatar renderer and the avatar's metadata; and
   communicating metadata for one or more player profiles describing an avatar to be rendered on the video game system using the avatar renderer during execution of the video game application.

2. The method according to claim 1 further comprising communicating additional animations provided by the video gaming system.

3. The method according to claim 1 further comprising informing the video game application which animation is currently playing.

4. The method according to claim 1 further comprising querying the video gaming system for model and view matrices based on one of head, head-and-shoulders, or full-body views.

5. The method according to claim 1 further comprising querying an online gaming service to retrieve avatar data.

6. The method according to claim 1 further comprising indicating whether a shadow map should be allocated for the avatar.

7. The method according to claim 1 further comprising providing access to a plurality of random avatars.

8. The method according to claim 7 further comprising specifying a male or female body for one of the plurality of random avatars.

9. The method according to claim 2 further comprising retrieving avatar data from profiles on the video gaming system that are not currently signed in.

10. A tangible computer readable storage medium storing thereon computer executable instructions for instantiating an API, the computer readable storage medium comprising instructions for:

instantiating a programming interface for allowing a video game application executing in a video game system to access data for rendering an avatar to a render target selected by the video game application, wherein the video game system is configured to provide rendering and animation functions and the video game application is configured to present a rendered avatar on a two-dimensional surface presented by the video game application and wherein the rendering and animation functions are configured to render the avatar to a destination in a rendered environment of the video game application so that the rendered avatar is displayed within the rendered environment of the video game application; and rendering one or more avatars at a rendering destination selected by the video game application.

11. The tangible computer readable storage medium according to claim 10 further comprising instructions for communicating additional animations provided by the video gaming system.

12. The tangible computer readable storage medium according to claim 10 further comprising instructions for informing the video game application which animation is currently playing.

13. The tangible computer readable storage medium according to claim 10 further comprising instructions for querying the video gaming system for model and view matrices based on one of head, head-and-shoulders, or full-body views.

14. The tangible computer readable storage medium according to claim 10 further comprising instructions for querying an online gaming service to retrieve avatar data.

15. The tangible computer readable storage medium according to claim 10 further comprising instructions for providing access to a plurality of random avatars.

16. The tangible computer readable storage medium according to claim 10 further comprising instructions for retrieving avatar data from profiles on the video gaming system that are not currently signed in.

17. A system adapted to instantiate an application programming interface (API), the system comprising:

at least one processor; and at least one memory communicatively coupled to said at least one processor, the memory having stored therein computer-executable instructions for implementing the API, the API configured to expose a programming interface for allowing a video game application executing in a video game system to access data for representing an avatar and incorporate the data into an avatar rendering function configured to receive data for constructing, rendering and animating the avatar to a destination in a rendered environment of the video game application so that the rendered avatar is displayed within the rendered environment of the video game application, the computer-executable instructions, when executed by the at least one process, cause the system to perform functions including:

requesting a data buffer size for storing the data;

allocating memory space in accordance with said buffer size;

specifying components of the avatar for retrieval, wherein an entire body of said avatar may be requested; and requesting the data for said avatar.

18. The system according to claim 17, wherein the video gaming system includes an avatar renderer, further comprising instructions for allowing the avatar renderer to render said avatar to a destination provided by the video game application.

19. The system according to claim 17, further comprising instructions for querying an online gaming service to retrieve avatar data released after the video game application is released.

20. The system according to claim 17, further comprising avatar asset retrieval logic that can be updated independently of the video game application.

* * * * *